(12) United States Patent
Elliott et al.

(10) Patent No.: US 7,404,104 B2
(45) Date of Patent: Jul. 22, 2008

(54) APPARATUS AND METHOD TO ASSIGN NETWORK ADDRESSES IN A STORAGE ARRAY

(75) Inventors: John C. Elliott, Tucson, AZ (US); Shah Mohammad Rezaul Islam, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 11/281,299

(22) Filed: Nov. 16, 2005

(65) Prior Publication Data

US 2007/0168703 A1 Jul. 19, 2007

(51) Int. Cl.
G06F 11/00 (2006.01)

(52) U.S. Cl. .............................. 714/7; 711/1
(58) Field of Classification Search .............. 714/7, 714/5–6, 8, 770; 711/1, 114, 200, 202, 209
See application file for complete search history.

(56) References Cited

U.S. PATENT DOCUMENTS

| 5,568,606 | A | 10/1996 | Dobbek |
| 5,787,459 | A | 7/1998 | Stallmo et al. |
| 5,809,224 | A | 9/1998 | Schultz et al. |
| 6,633,566 | B1 * | 10/2003 | Pierson, Jr. ............. 370/395.1 |
| 6,938,181 | B1 * | 8/2005 | Talagala et al. ................. 714/7 |
| 7,308,532 | B1 * | 12/2007 | Wood et al. .................. 711/112 |
| 7,343,409 | B1 * | 3/2008 | Kremer et al. ............... 709/224 |
| 2002/0196601 | A1 * | 12/2002 | Lee et al. ..................... 361/685 |
| 2005/0152192 | A1 * | 7/2005 | Boldy et al. ............ 365/189.05 |
| 2006/0048014 | A1 * | 3/2006 | Takahashi et al. ............. 714/44 |

OTHER PUBLICATIONS

Levy et al, "Distributed File Systems: Concepts and Examples," ACM Computing Surveys, vol. 22, No. 4, Dec. 1990, pp. 321-374.
Tanenbaum et al., "Distributed Operating Systems," Computing Surveys, vol. 17, No. 4, Dec. 1985, pp. 419-470.

* cited by examiner

Primary Examiner—Dieu-Minh Le
(74) Attorney, Agent, or Firm—Dale F. Regelman; Quarles & Brady LLP

(57) ABSTRACT

A method is disclosed to assign network addresses in a storage array disposed in a data storage and retrieval system comprising (P) data storage devices disposed in (N) data storage device assemblies. The method configures the (N) data storage device assemblies to comprise a spare data storage device assembly and a first storage array comprising (N–1) active data storage device assemblies, wherein each data storage device configured in the first storage array is assigned a network address, and wherein one of the spare data storage device disposed in the spare data storage device assembly is assigned a network address. In the event the method detects a failed data storage device disposed in the first storage array, then the method forms a second storage array comprising the first storage array, except the failed data storage device, in combination with the (i)th spare data storage device.

13 Claims, 21 Drawing Sheets

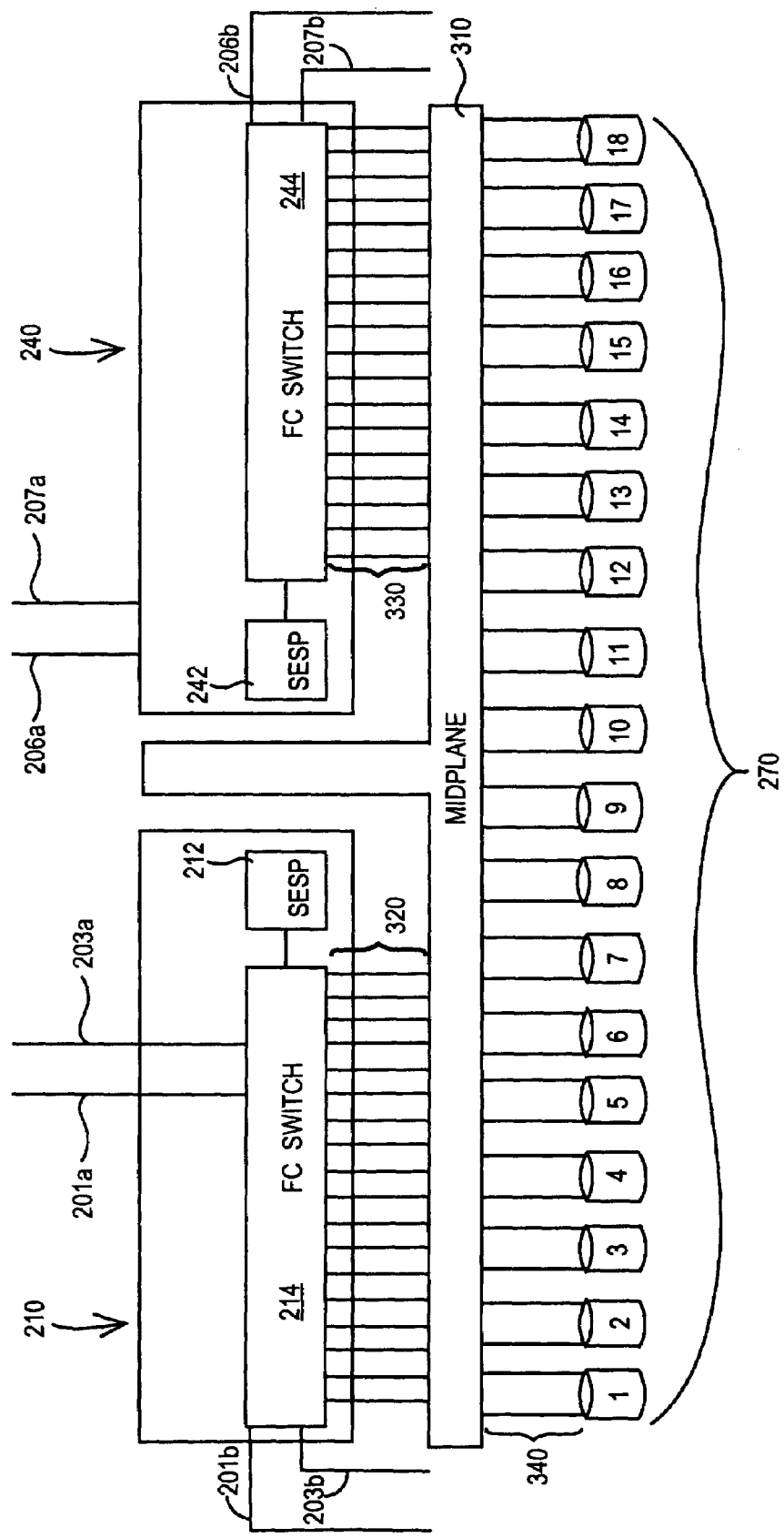

APPARATUS AND METHOD TO ASSIGN NETWORK ADDRESSES IN A STORAGE ARRAY

FIELD OF THE INVENTION

This invention relates to an apparatus and method to assign network addresses in a storage array.

BACKGROUND OF THE INVENTION

Data storage and retrieval systems are used to store information provided by one or more host computer systems. Such data storage and retrieval systems receive requests to write information to a plurality of data storage devices, and requests to retrieve information from that plurality of data storage devices. Upon receipt of a read request, the system recalls information from the plurality of data storage devices, and optionally moves that information to a data cache. Thus, the system is continuously moving information to and from a plurality of data storage devices, and optionally to and from a data cache.

It is known in the art to configure the plurality of data storage devices to form a storage array. In certain embodiments, such storage array comprises two or more data storage device assemblies, wherein each of those assemblies comprises two or more data storage devices. What is further needed is a method to assign network addresses in a data storage array comprising a plurality of data storage device assemblies upon the failure of a data storage device disposed in one of those data storage device assemblies.

SUMMARY OF THE INVENTION

Applicants' invention comprises a method to assign network addresses in a storage array. The method supplies a data storage and retrieval system comprising (P) data storage devices disposed in (N) data storage device assemblies, wherein each of the (N) data storage device assemblies comprises (M) data storage devices, wherein (P) is equal to or greater than 4, and wherein (N) is greater than or equal to 2, and wherein (M) is greater than or equal to 2. The method generates (Q) network addresses, wherein (Q) is less than (P), and assigns each of those (Q) network addresses to a different data storage device, wherein the (P) data storage devices comprise (Q) data storage devices assigned a network address and (P-Q) data storage devices not assigned a network address.

The method configures the (N) data storage device assemblies to comprise a spare data storage device assembly and a first storage array comprising (N-1) active data storage device assemblies, wherein each data storage device configured in the first storage array is assigned a network address, and wherein the (i)th spare data storage device disposed in the spare data storage device assembly is assigned a network address, and wherein (i) is greater than or equal to 1 and less than or equal to (M). In the event the method detects a failed data storage device, wherein that failed data storage device is disposed in a degraded data storage device assembly, and wherein the first storage array comprises that degraded data storage device assembly, then the method forms a second storage array comprising the first storage array, except said failed data storage device, in combination with the (i)th spare data storage device.

BRIEF DESCRIPTION OF THE DRAWINGS

The invention will be better understood from a reading of the following detailed description taken in conjunction with the drawings in which like reference designators are used to designate like elements, and in which:

FIG. 3A is a block diagram showing a plurality of data storage devices interconnected to a fibre channel arbitrated loop switch;

DETAILED DESCRIPTION OF THE PREFERRED EMBODIMENTS

The invention is described in preferred embodiments in the following description with reference to the Figures, in which like numbers represent the same or similar elements. The invention will be described as embodied in an information storage and retrieval system which comprises six (6) data storage device assemblies, wherein each of those data storage device assemblies comprises three (3) data storage devices. This description of Applicants' invention is not meant, however, to limit Applicants' invention to an information storage and retrieval system comprising 18 data storage devices, as the invention can be implemented generally in an information storage and retrieval system comprising a plurality of data storage device assemblies, wherein each of those data storage device assemblies comprises a plurality of data storage devices.

Figure 1:
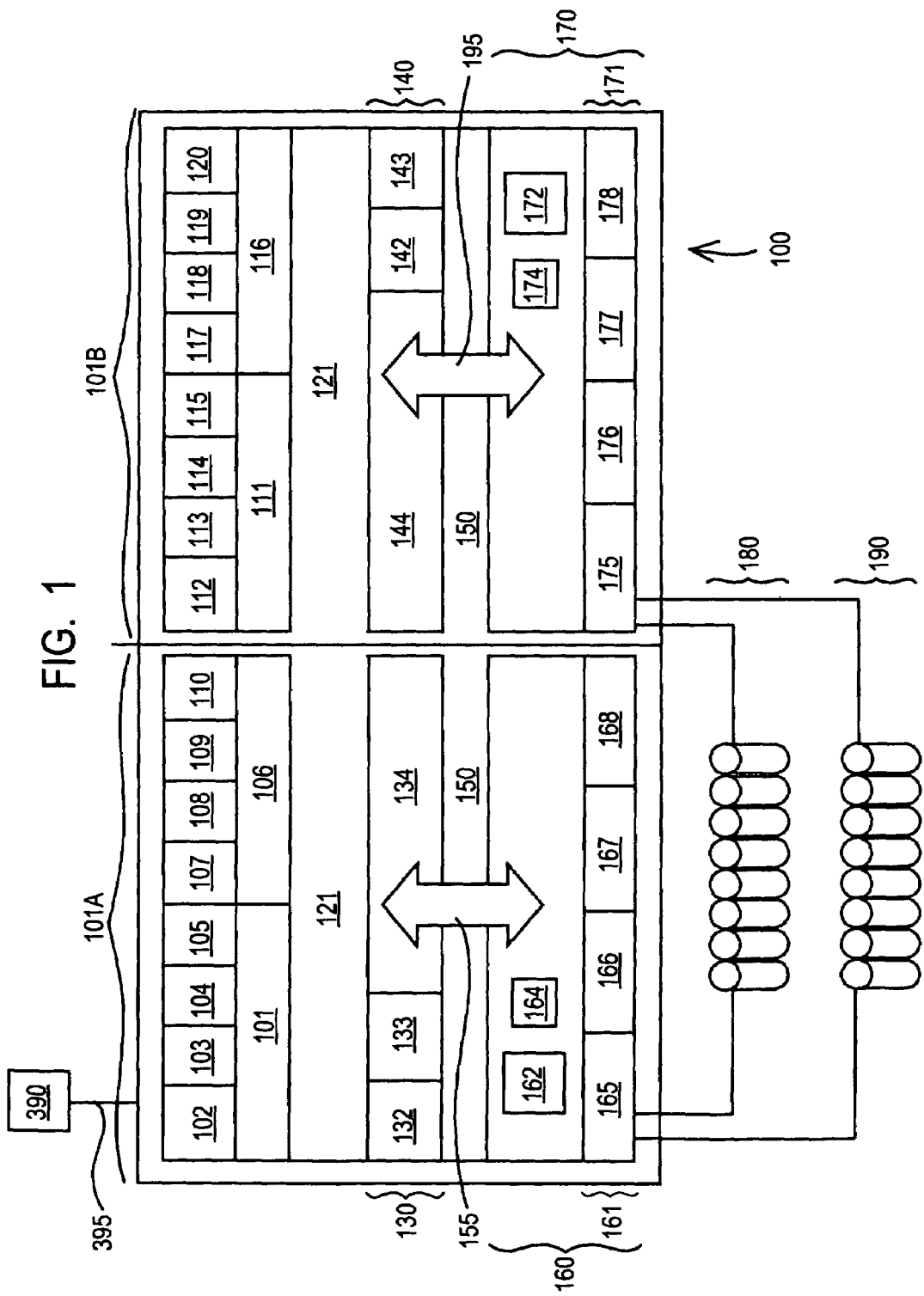
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage and retrieval system, such as the IBM DFSMS implemented in the IBM MVS operating system.

In certain embodiments, Applicants' information storage and retrieval system includes a plurality of host adapters. In the illustrated embodiment of FIG. 1, system 100 comprises host adapters 102-105, 107-110, 112-115 and 117-120. In other embodiments, Applicants' information storage and retrieval system includes fewer than 16 host adapters. In still other embodiments, Applicants' information storage and retrieval system includes more than 16 host adapters. In certain embodiments, one or more of the host adapters are multiported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, and the like. Each host adapter is connected to both cluster nodes through interconnect bus 121 such that each cluster node can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' information storage and retrieval system. Similarly, in certain embodiments, one or more host adapters, processor portion 140, one or more device adapters are disposed on a second control card disposed in Applicants' information storage and retrieval system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
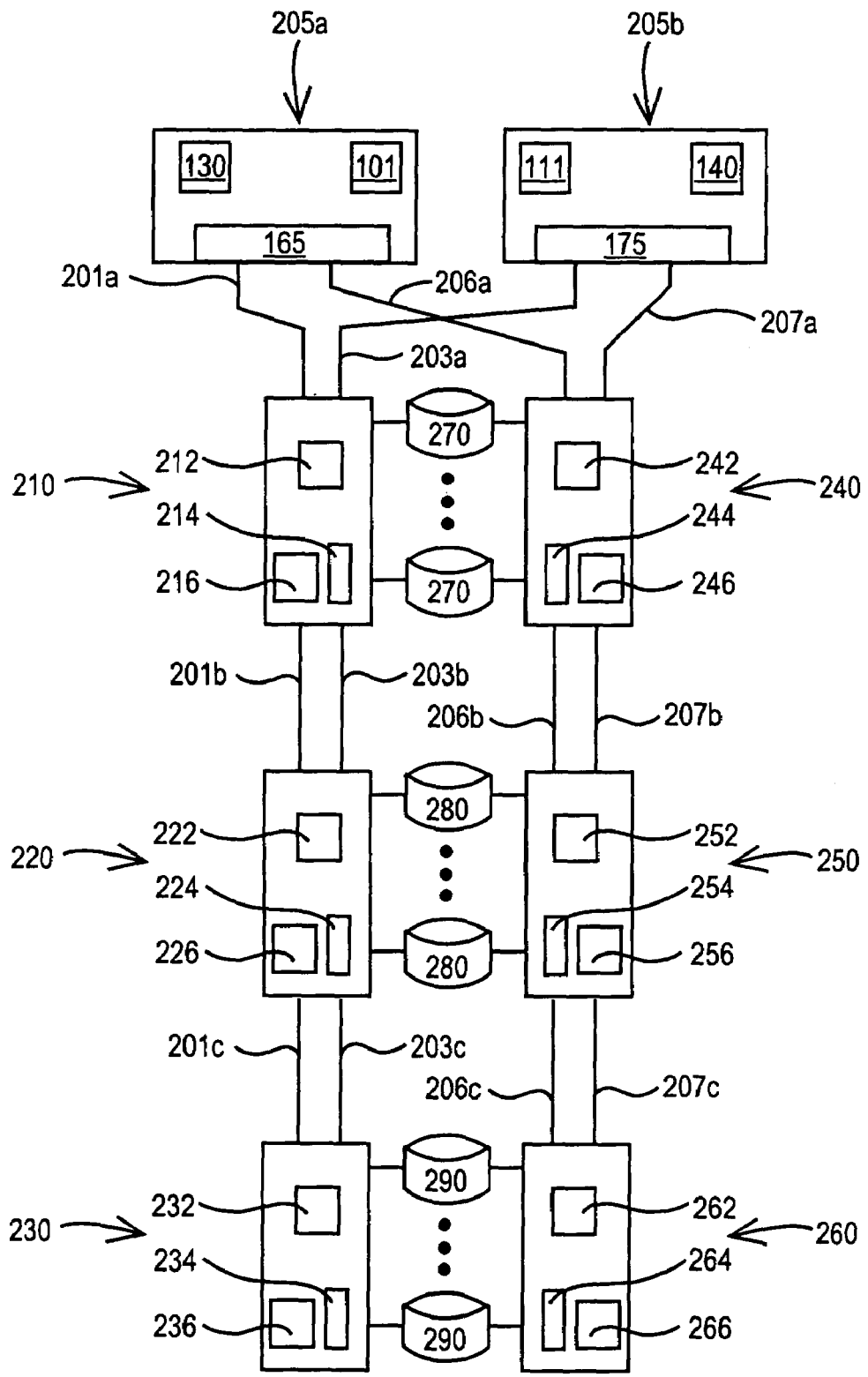
FIG. 2 is a block diagram showing the data storage and retrieval system of FIG. 1 comprising two initiators and a plurality of data storage devices.

In the illustrated embodiment of FIG. 2, Applicants' information storage and retrieval system comprises dual fibre channel arbitrated ("FC-AL") loops of switches where initiator 205a and initiator 205b are interconnected with two FC-AL loops. In the illustrated embodiment of FIG. 2, initiator 205a comprises plurality of host adapters 101 (FIGS. 1, 2), control element 130 (FIGS. 1, 2), and device adapter 165 (FIGS. 1, 2). In the illustrated embodiment of FIG. 2, initiator 205*b* comprises plurality of host adapters 111 (FIGS. 1, 2), control element 140 (FIGS. 1, 2), and device adapter 175 (FIGS. 1, 2).

Each FC-AL loop contains one or more local controllers, such as local controllers 210, 220, 230, 240, 250, and 260. Each local controller comprises a switch, a processor, and microcode. In certain embodiments, the switch comprises a Fibre Channel switch. In certain embodiments, the processor comprises a SES processor. For example, local controllers 210, 220, 230, 240, 250, and 260, include processors 212, 222, 232, 242, 252, and 262, respectively. Similarly, local controllers 210, 220, 230, 240, 250, and 260, include switches 214, 224, 234, 244, 254, and 264, respectively. In addition, local controllers 210, 220, 230, 240, 250, and 260, include microcode 216, 226, 236, 246, 256, and 266, respectively.

Local controller 210 in combination with plurality of data storage devices 270 comprises a first switch domain. Local controller 240 in combination with plurality of storage devices 270 comprises a second switch domain.

Referring now to FIG. 3A, in certain embodiments Applicants' apparatus further includes a midplane interconnecting one or more switches to one or more data storage devices. In the illustrated embodiment of FIG. 3A, controller 210 (FIGS. 2, 3) comprises Fibre Channel switch 214 (FIGS. 2, 3) and SES processor 212 (FIGS. 2, 3). A plurality of communication links 320 interconnect Fibre Channel switch 214 to midplane 310. A plurality of communication links 340 interconnect data storage devices 270 (FIGS. 2, 3) with midplane 310.

Controller 240 (FIGS. 2, 3) comprises Fibre Channel switch 244 (FIGS. 2, 3) and SES processor 242 (FIGS. 2, 3). A plurality of communication links 330 interconnect Fibre Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310.

Figure 3B:
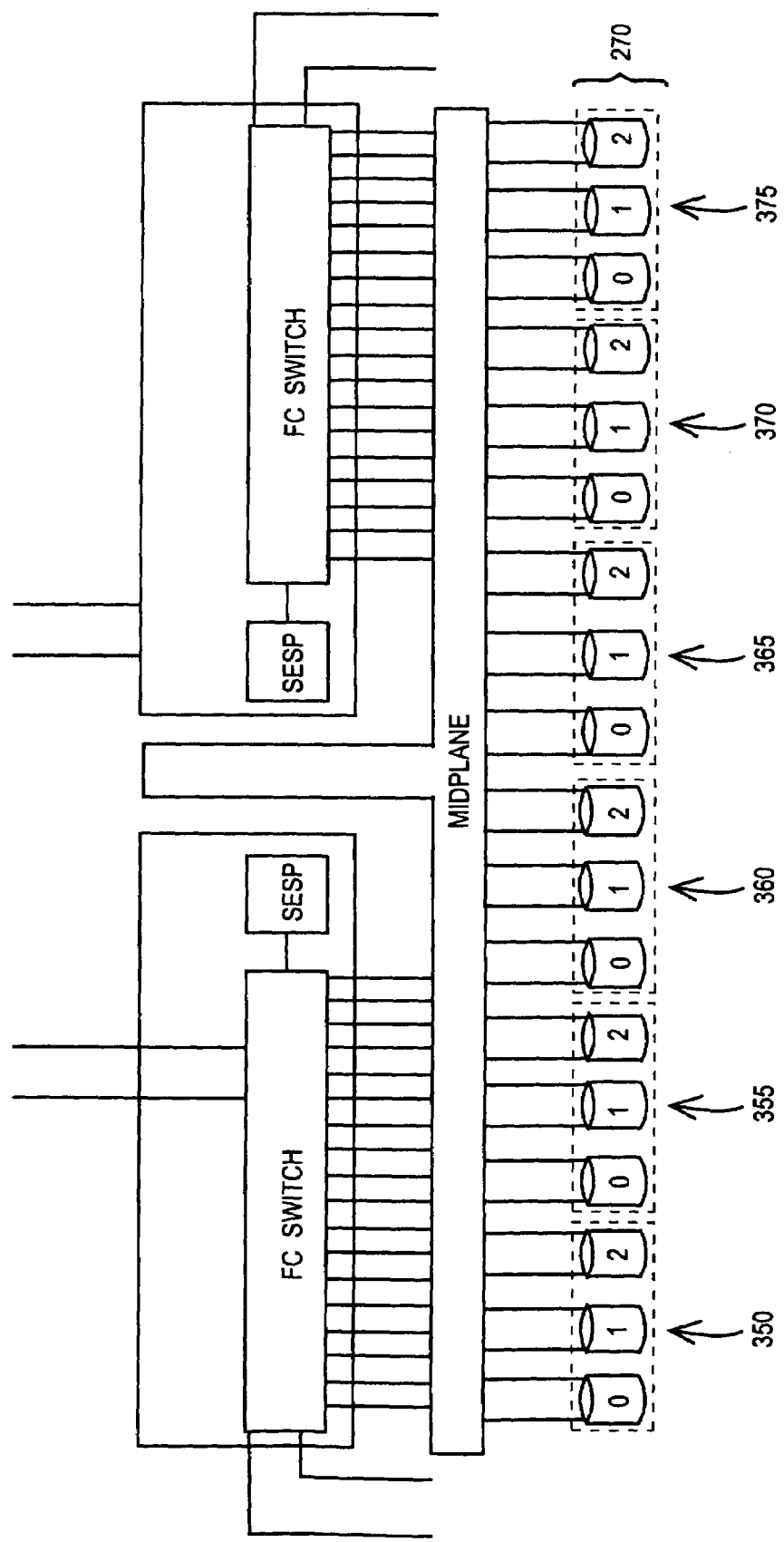
FIG. 3B is a block diagram showing the plurality of data storage devices of FIG. 3A comprising six data storage device assemblies.

In the illustrated embodiment of FIG. 3B, data storage devices 270 are disposed in six separate data storage device assemblies. Referring to FIGS. 3A and 3B, data storage devices 1, 2, and 3 of FIG. 3A comprise data storage device assembly 350 of FIG. 3B. Data storage devices 4, 5, and 6 of FIG. 3A comprise data storage device assembly 355 of FIG. 3B. Data storage devices 7, 8, and 9 of FIG. 3A comprise data storage device assembly 360 of FIG. 3B. Data storage devices 10, 11, and 12 of FIG. 3A comprise data storage device assembly 365 of FIG. 3B. Data storage devices 13, 14, and 15 of FIG. 3A comprise data storage device assembly 370 of FIG. 3B. Data storage devices 16, 17, and 18 of FIG. 3A comprise data storage device assembly 375 of FIG. 3B.

In certain embodiments, data storage device assemblies 350, 355, 360, 365, 370, and 375, comprise logical groupings of data storage devices. In certain embodiments, data storage device assemblies 350, 355, 360, 365, 370, and 375, comprise physical groupings of data storage devices, wherein each physical grouping comprises three data storage devices and the associated interconnections for those three data storage devices with midplane 310.

In certain embodiments, each such physical grouping of data storage devices comprises an integral assembly. In certain embodiments, each such physical grouping of data storage devices comprises a service boundary, wherein a repair or replacement of any one data storage device disposed in that assembly requires removal of the entire data storage device assembly from Applicants' data storage and retrieval system.

Applicants' apparatus and method addresses storage devices using arbitrated loop physical addresses ("AL_PAs"). The FC-AL architecture limits the number of AL_PA's available on each FC-AL loop to 127 (one for the FL Port and 126 for NL Ports). For modular storage systems, each module is typically assigned a binary multiple number of the AL_PAs available, i.e. 2, 4, 8, 16, 32, and so on. In certain embodiments, Applicants' storage arrays comprise a non-binary multiple number of storage devices. For example and referring again to FIGS. 3A and 3B, storage array 270 comprises 18 storage devices. In order to assign a different AL_PA to each of those 18 storage devices, a total of 32 AL_PAs would typically need to be allocated to the module. Fourteen of those allocated 32 AL_PAs would not be used.

Figure 4:
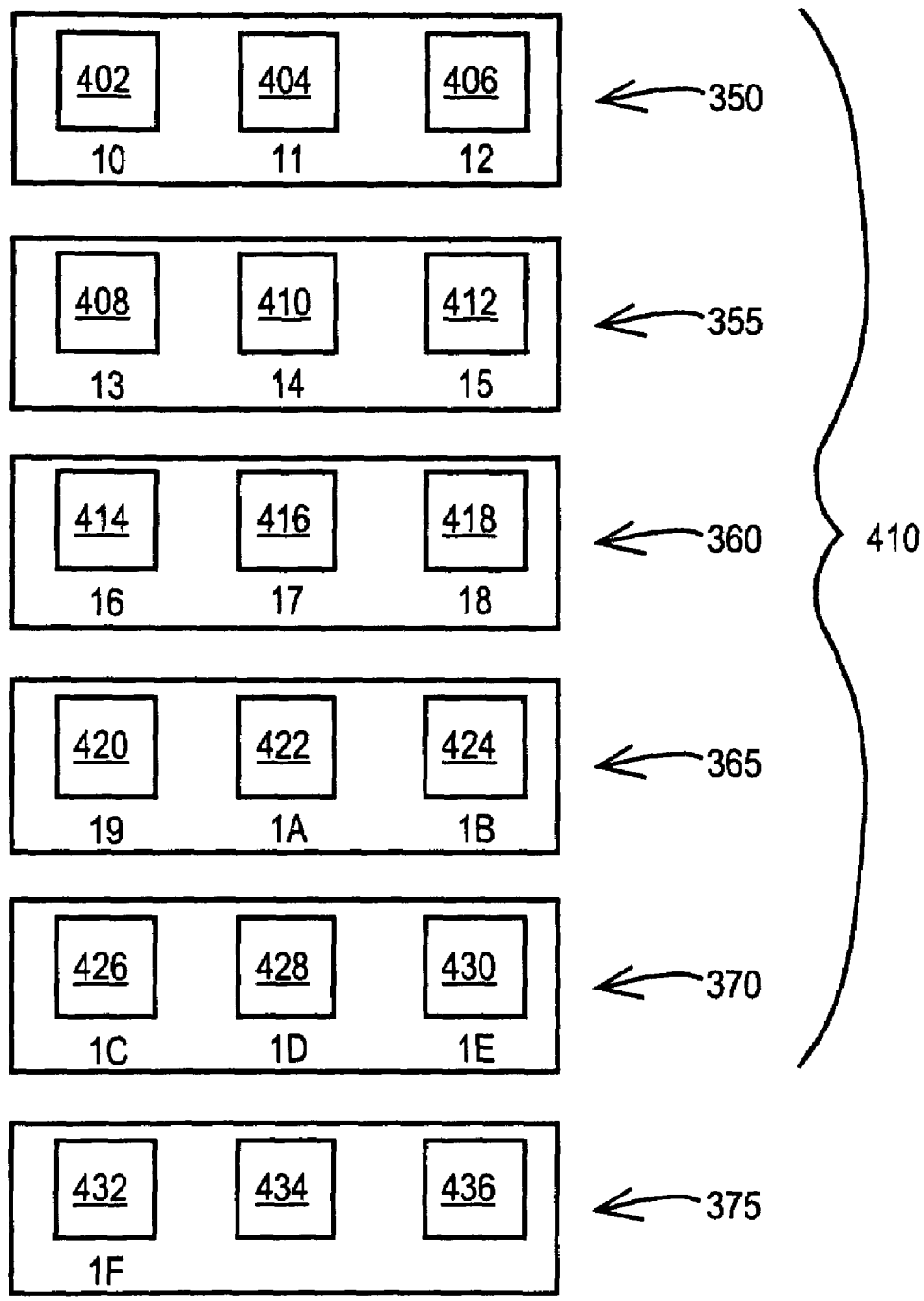
FIG. 4 is a block diagram showing the six data storage device assemblies of FIG. 3B, and a first storage array comprising five active data storage device assemblies, and a spare data storage device assembly.

FIG. 4 shows the six data storage device assemblies of FIG. 3B. Storage array 410 is configured to comprise data storage device assemblies 350, 355, 360, 365, and 370. Data storage device assembly 375 comprises a spare assembly, wherein data storage devices 432, 434, and 436, each comprise a spare device.

In certain embodiments applicants method is compliant with Section 6.4.1.3 entitled "SEL_n signals" of SFF Committee SFF-8067 Specification for 40-pin SCA-2 Connector w/Bidirectional ESI (hereafter referred to as the "AL_PA Specification")," which is hereby incorporated by reference. As those skilled in the art will appreciate, the SFF Committee is an ad hoc group formed to address disk industry needs in a prompt manner. When formed in 1990, the original goals were limited to defining de facto mechanical envelopes for disk drives so they could fit into laptop computers and other small products. In November 1992, the SFF Committee objectives broadened to encompass other areas which needed prompt industry action. SFF Specifications are narrow in scope, to reduce development time.

Among other requirements, the AL_PA Specification specifies that storage devices will claim a loop identifier that is mapped according to tables in FC-AL to the proper' AL_PA (AL Physical Address) for the SCSI device, based upon the SEL_n signal inputs detected. The term AL_PA is hereafter used interchangeably to refer to the actual FC-AL defined Arbitrated Loop Physical Address and/or the SEL_n signals defined in the AL_PA Specification.

Data storage device assembly 350 comprises data storage devices 402, 404, and 406, wherein those data storage devices are assigned AL_PAs 10, 11, and 12, respectively. In actual implementation, actual AL-PA addresses may comprises a different format from that used herein. As those skilled in the art will appreciate, an AL-PA addressed storage device is instructed to claim the AL_PA associated with a designated sel_n signal.

Data storage device assembly 355 comprises data storage devices 408, 410, and 412, wherein those data storage devices are assigned AL_PAs 13, 14, and 15, respectively. Data storage device assembly 360 comprises data storage devices 414, 416, and 418, wherein those data storage devices are assigned AL_PAs 16, 17, and 18, respectively. Data storage device assembly 365 comprises data storage devices 420, 422, and 424, wherein those data storage devices are assigned AL_PAs 19, 1A, and 1B, respectively. Data storage device assembly 370 comprises data storage devices 426, 428, and 430, wherein those data storage devices are assigned AL_PAs 1C, 1D, and 1E, respectively. Spare data storage device assembly 375 comprises data storage devices 432, 434, and 436, wherein data storage device 432 is assigned the AL-PA 1F, and wherein data storage devices 434 and 436 are not assigned AL_PAs.

Referring now to FIG. 3B the network address, physical location, configuration, and status, of each data storage device assembly is known and monitored by SES processor 212 and SES processor 242. Referring now to FIGS. 2 and 3A, SES processors 212 and 242 report the status of each data storage device assembly, and of each data storage device disposed in those assemblies, to initiator 205a (FIG. 2) and initiator 205b (FIG. 2).

Applicants' invention comprises a method to, upon the failure of a data storage device configured in storage array 410, rebuild on a spare data storage device assigned an AL_PA the data written to the failed device. Applicants' method then sequentially transfers to a second spare data storage device the AL_PA assigned to the failed data storage device, copies data to that second spare data storage device from a first operable data storage device disposed in the data storage device assembly comprising the failed data storage device. The method then transfers to a third spare data storage device the AL_PA assigned to that first operable data storage device disposed in the data storage device assembly comprising the failed data storage device, and copies data to that third spare data storage device from a second operable data storage device disposed in the data storage device assembly comprising the failed data storage device.

Figure 17A:
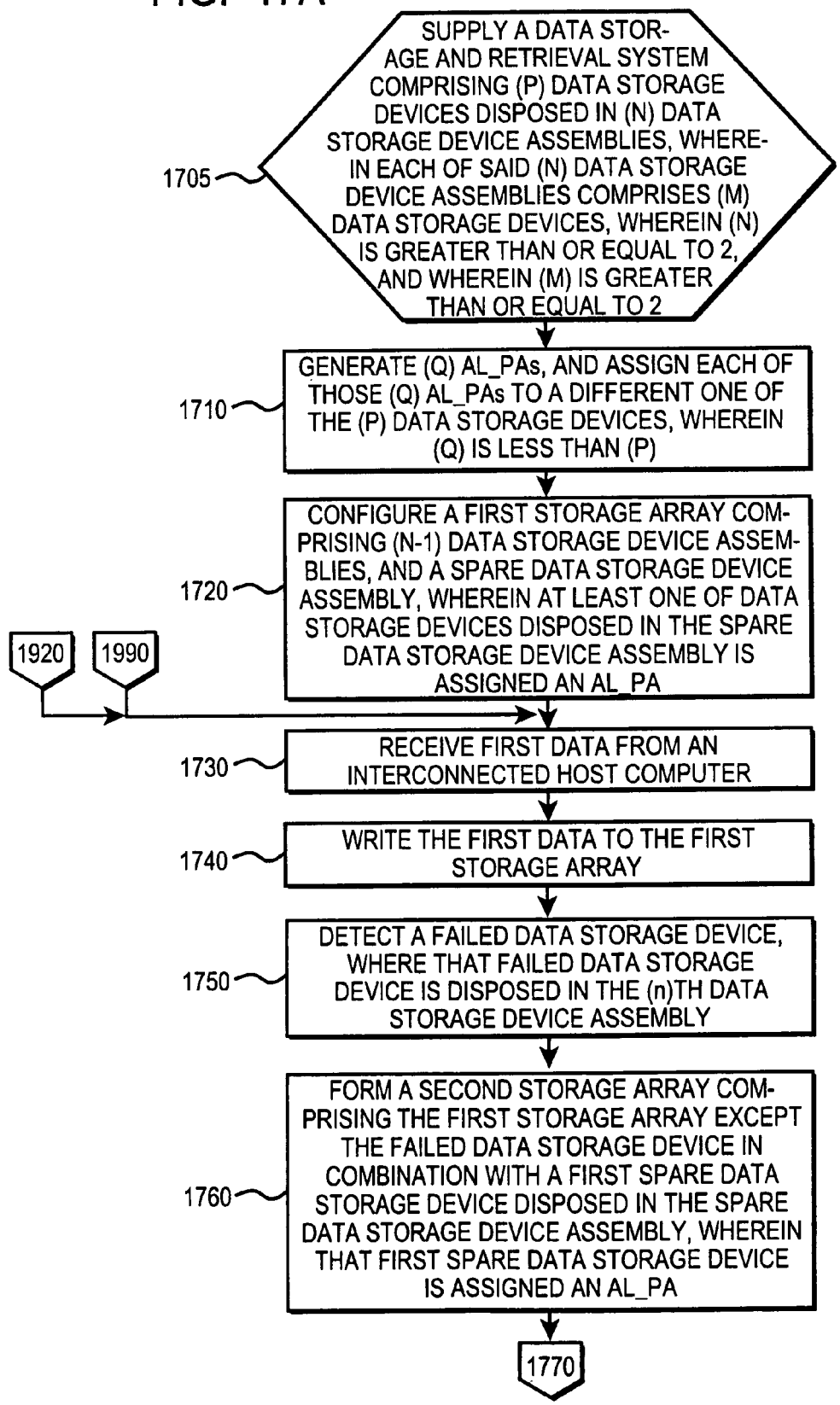
FIG. 17A is a flow chart summarizing certain steps of Applicants' method.

Referring now to FIG. 17A, in step 1705 Applicants' method provides a data storage and retrieval system comprising a (P) data storage devices, wherein those (P) data storage devices are arranged in (N) data storage device assemblies, wherein each of those data storage device assemblies comprises (M) data storage devices, wherein (N) is greater than or equal to 2, and wherein (M) is greater than or equal to 2. As those skilled in the art will appreciate, (P) equals the multiplication product of (N) and (M).

As an example, in the illustrated embodiment of FIG. 4 Applicant's data storage and retrieval system comprises six (6) data storage device assemblies wherein each of those assemblies comprises three (3) data storage devices. In certain embodiments, the data storage and retrieval system of step 1705 is owned and/or operated by a data storage services provider, wherein that provider provides data storage services to one or more data storage services customers.

In step 1710, Applicants' method generates (Q) AL_PAs, and assigns each of those (Q) AL_PAs to a different one of the (P) data storage devices, wherein (Q) is less than (P). In the illustrated embodiment of FIG. 4, for example, Applicants' method generates 16 AL_PAs, and assigns each of those 16 AL_PAs to a different one of the 18 data storage devices. Data storage devices 434 and 436 are not assigned AL_PAs.

In certain embodiments, step 1710 is performed by a processor, such as processor 132 disposed in the data storage and retrieval system. In certain embodiments, step 1710 is performed by an initiator, such as initiator 205a, disposed in the data storage and retrieval system. In certain embodiments, step 1710 is performed by a host computer in communication with Applicants' data storage and retrieval system.

In step 1720, Applicants' method configures a first storage array comprising (N−1) data storage device assemblies, and a spare data storage device assembly, such that at least one data storage device disposed on the spare data storage device assembly is assigned an AL_PA. In the illustrated embodiment of FIG. 4, data storage device assemblies 350, 355, 360, 365, 370, and 375, are configured in storage array 410. Data storage device assembly 375 comprises a spare data storage device assembly, wherein the data storage devices comprising assembly 375 are spare drives, and wherein at least one of those spare devices, namely data storage device 432, is assigned an AL-PA.

In certain embodiments, step 1720 is performed by a processor, such as processor 132 disposed in the data storage and retrieval system. In certain embodiments, step 1720 is performed by an initiator, such as initiator 205a, disposed in the data storage and retrieval system. In certain embodiments, step 1720 is performed by a host computer in communication with Applicants' data storage and retrieval system.

In step 1730, Applicants' data storage and retrieval system receives first data from an interconnected host computer. In certain embodiments, the first data of step 1730 comprises customer data provided to Applicants' data storage and retrieval system from a customer's host computer.

In step 1740, Applicants' method writes the first data of step 1730 to the first storage array of step 1720. In certain embodiments, step 1740 comprises writing that first data to the first storage array using a RAID protocol. In certain embodiments, that RAID protocol comprises, without limitation, a RAID 1 protocol. In certain embodiments, that RAID protocol comprises, without limitation, a RAID 5 protocol. In certain embodiments, that RAID protocol comprises, without limitation, a RAID 10 protocol. In certain embodiments, step 1740 comprises writing that first data to the first storage array using a customer-defined storage protocol, wherein that customer-defined storage protocol comprises writing the first data to more than 1 data storage device.

Figure 5:
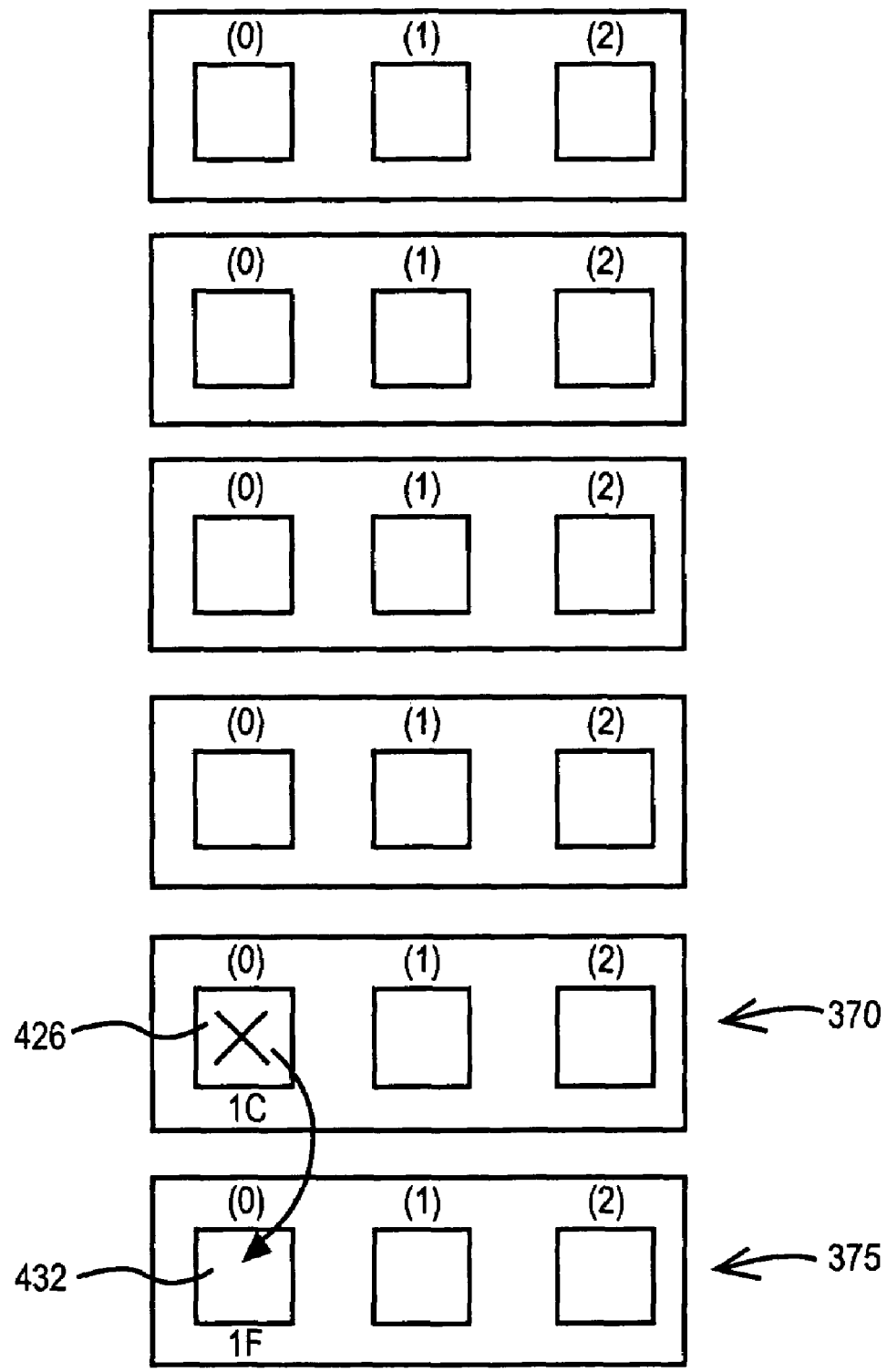
FIG. 5 is a block diagram showing a failed data storage device disposed a degraded storage device assembly, and illustrating a portion of Applicants' method wherein the data written to the failed device is rebuilt to a first data storage device disposed in the spare data storage device assembly.

Referring now to FIGS. 5 and 17A, in step 1750 Applicants' method detects a failed data storage device, such as storage device 426 disposed in degraded data storage device assembly 370, where the first storage array of step 1720, such as storage array 410 (FIG. 4), comprises that degraded data storage device assembly. In certain embodiments, step 1750 is performed by an SES processor, such as SES processor 212, in communication with the failed device. In certain embodiments, that detecting SES processor provides an alert regarding the identity and address of the failed device to an interconnected initiator, such as initiator 205a. In certain embodiments, step 1750 is performed by an interconnected initiator, such as initiator 205a.

Applicants' method transitions from step 1750 to step 1760 wherein the method forms a second storage array comprising the first storage array, except the failed data storage device, in combination with a first spare data storage device, such as storage device 432, disposed in the spare data storage device assembly, such as assembly 375, where that first spare data storage device is assigned an AL_PA. In certain embodiments, step 1760 is performed by a processor, such as processor 132 disposed in the data storage and retrieval system. In certain embodiments, step 1760 is performed by an initiator, such as initiator 205a, disposed in the data storage and retrieval system. In certain embodiments, step 1760 is performed by a host computer in communication with Applicants' data storage and retrieval system.

Referring now to FIGS, 5, 17A, and 17B, Applicants' method transitions from step 1760 to step 1770 wherein the method rebuilds the first data written to the failed data storage device, such as data storage device 426, on the first spare data storage device, such as device 432, configured in the second storage array of step 1760. In certain embodiments, the rebuilding method of step 1770 is a function of the storage protocol selected in step 1740. For example, if using a RAID 1 protocol, then step 1770 comprises identifying the "mirrored" storage device for the failed storage device, and copying the data from that "mirrored" device to the first spare data storage device. On the other hand, if a RAID 5 protocol is selected in step 1740, then step 1770 comprises rebuilding the data written to the failed data storage device using XOR functions and method known to those of skill in the art.

In certain embodiments, step 1770 is performed by a processor, such as processor 132 disposed in the data storage and retrieval system. In certain embodiments, step 1770 is performed by an initiator, such as initiator 205a, disposed in the data storage and retrieval system. In certain embodiments, step 1770 is performed by a host computer in communication with Applicants' data storage and retrieval system.

Applicants' method transitions from step 1770 to step 1780, wherein Applicants' data storage and retrieval system receives second data, i.e. data received after configuring the second storage array of step 1760. In certain embodiments, steps 1770 and 1780 are performed substantially synchronously. In certain embodiments, the second data of step 1780 comprises customer data provided by one or more customer owned and/or operated host computers in communication with Applicants' data storage and retrieval system, such as system 100. Applicants' method transitions from step 1780 to step 1790 wherein Applicants' method writes the second data of step 1780 to the second storage array of step 1760.

Figure 6:
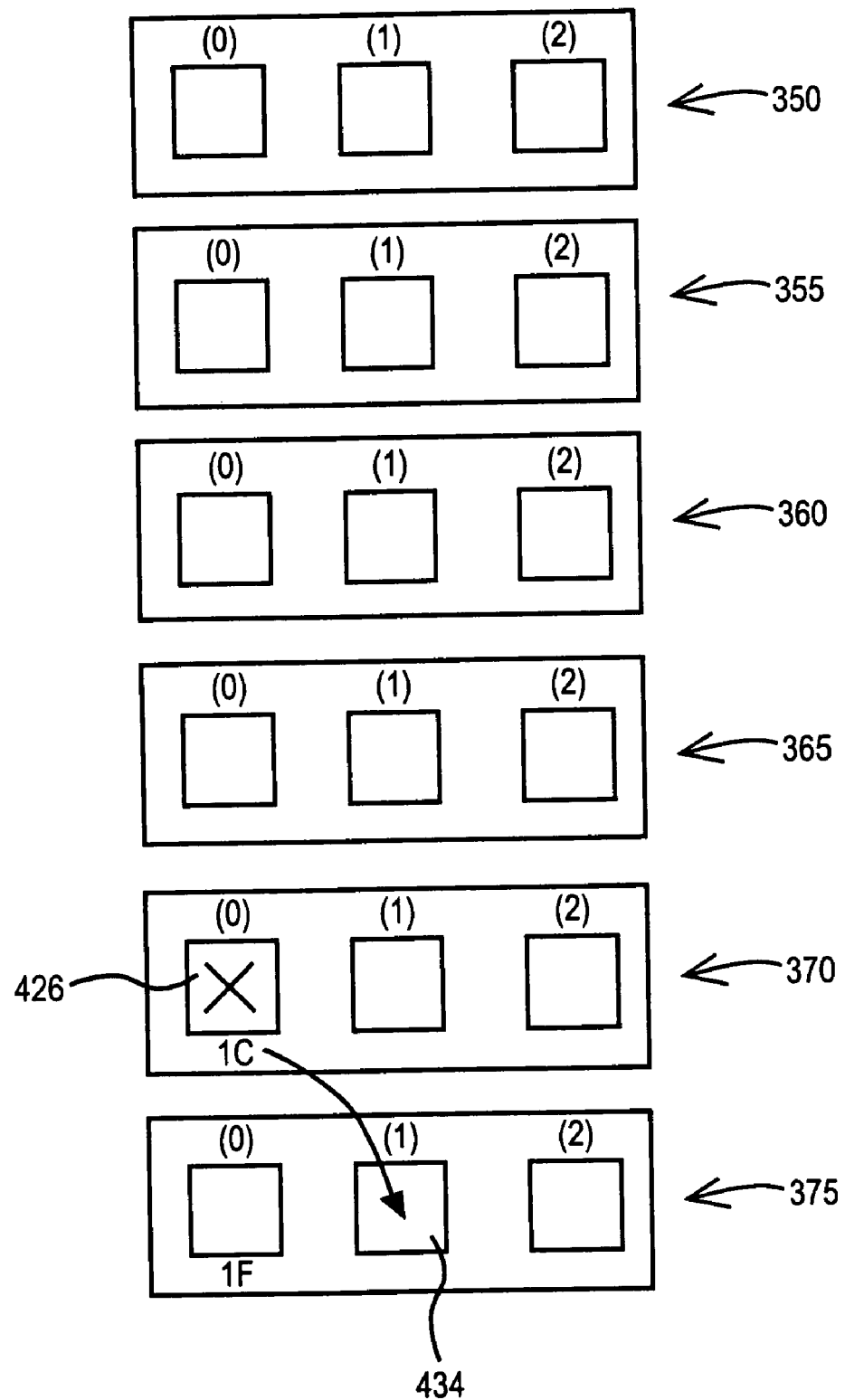
FIG. 6 is a block diagram illustrating a portion of Applicants' method wherein the network address assigned to the failed data storage device is transferred to a second data storage device disposed in the spare data storage device assembly.

In certain embodiments, Applicants' method ends at step 1790. In other embodiments, and referring now to FIGS. 6 and 18, Applicants' method transitions from step 1790 to step 1805 wherein the method transfers the AL_PA assigned to the failed data storage device, such as failed device 426, to a second spare data storage device, such as data storage device 434. In certain embodiments, step 1805 is performed by a processor, such as processor 132 disposed in the data storage and retrieval system. In certain embodiments, step 1805 is performed by an initiator, such as initiator 205a, disposed in the data storage and retrieval system. In certain embodiments, step 1805 is performed by a host computer in communication with Applicants' data storage and retrieval system.

Figure 7:
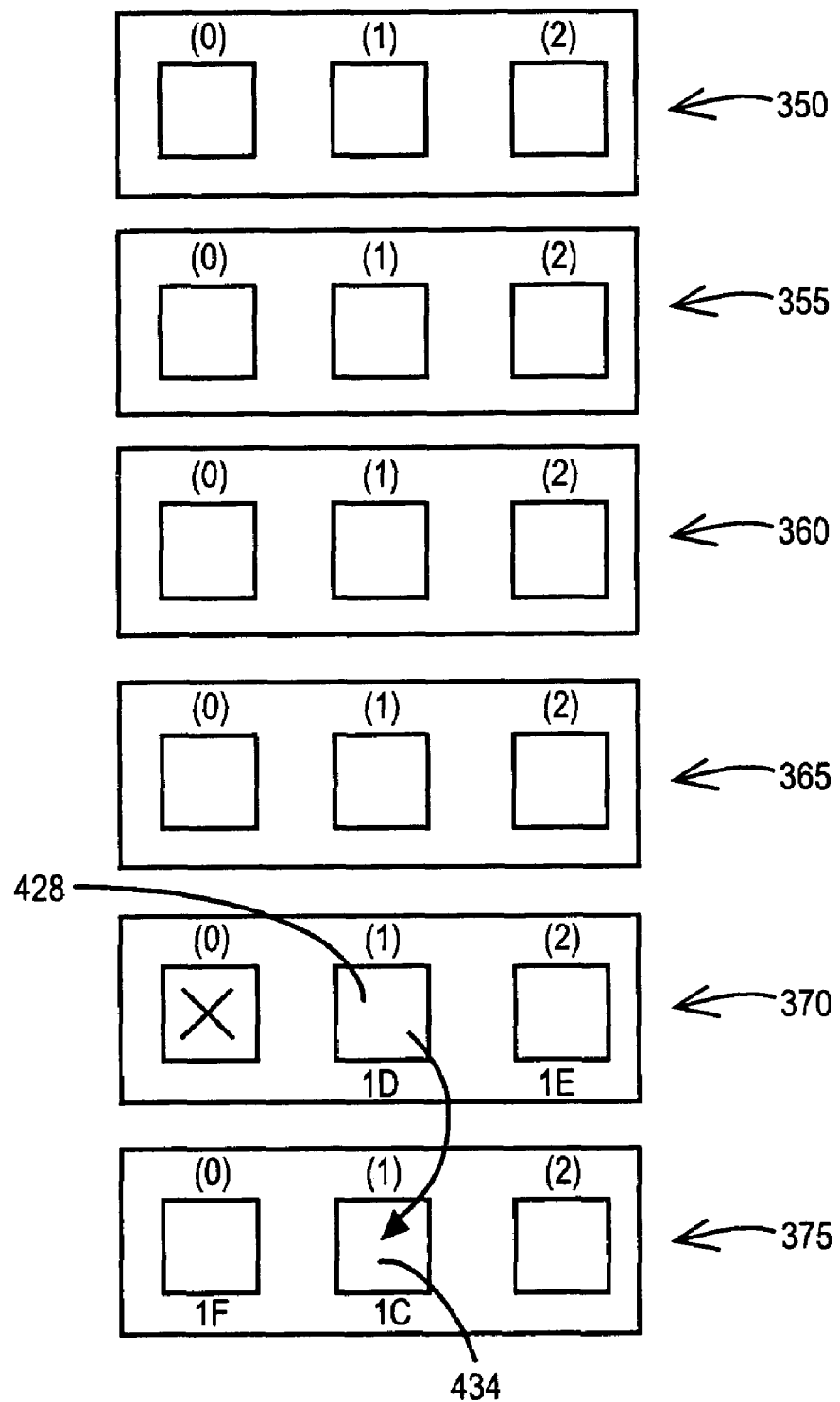
FIG. 7 is a block diagram illustrating a portion of Applicants' method wherein the data written to a first operable data storage device disposed in the degraded data storage device assembly is copied to the second data storage device disposed in the spare data storage device assembly.

Referring now to FIG. 7, Applicants' method transitions from step 1805 to step 1810 wherein the method copies first data and second data from a first operative data storage device disposed in the same data storage device assembly as the failed data storage device, such as for example data storage device 428 (FIG. 4), to the second spare data storage device, such as device 434. In certain embodiments, step 1810 is performed by a processor, such as processor 132 disposed in the data storage and retrieval system. In certain embodiments, step 1810 is performed by an initiator, such as initiator 205a, disposed in the data storage and retrieval system. In certain embodiments, step 1810 is performed by a host computer in communication with Applicants' data storage and retrieval system.

Figure 8:
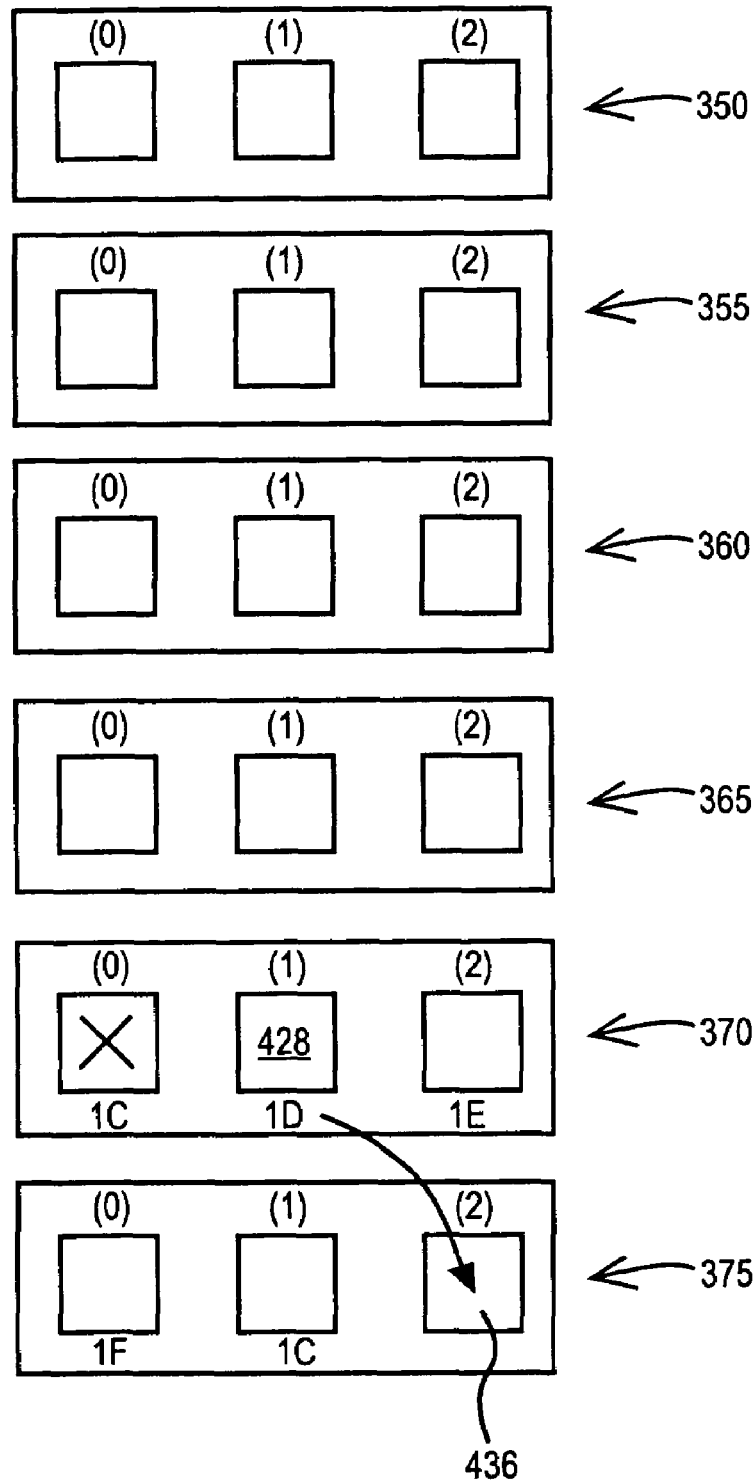
FIG. 8 is a block diagram illustrating a portion of Applicants' method wherein the network address assigned to the first operable data storage device disposed in the degraded data storage device assembly is transferred to a third data storage device disposed in the spare data storage device assembly.

Referring now to FIG. 8, Applicants' method transitions from step 1810 to step 1820 wherein the method transfers the AL_PA assigned to the first operative data storage device, such as device 428 to a third spare data storage device, such as data storage device 436. In certain embodiments, step 1820 is performed by a processor, such as processor 132 disposed in the data storage and retrieval system. In certain embodiments, step 1820 is performed by an initiator, such as initiator 205a, disposed in the data storage and retrieval system. In certain embodiments, step 1820 is performed by a host computer in communication with Applicants' data storage and retrieval system.

Figure 9:
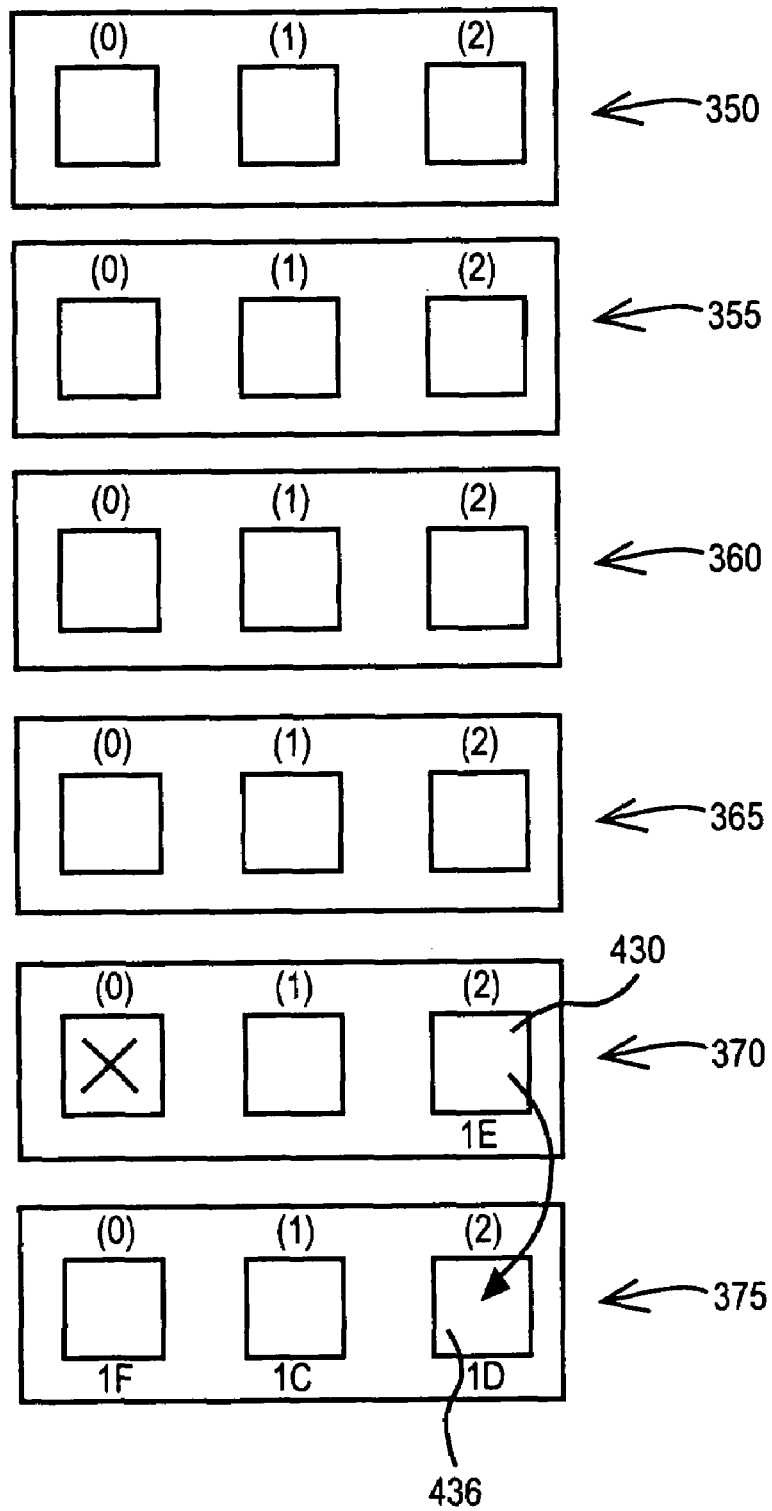
FIG. 9 is a block diagram illustrating a portion of Applicants' method wherein the data written to a second operable data storage device disposed in the degraded data storage device assembly is copied to the third data storage device disposed in the spare data storage device assembly.

Referring now to FIG. 9, Applicants' method transitions from step 1820 to step 1830 wherein the method copies first data and second data from a second operative data storage device disposed in the same data storage device assembly as the failed data storage device, such as for example data storage device 430, to the third spare data storage device, such as device 436. In certain embodiments, step 1830 is performed by a processor, such as processor 132 disposed in the data storage and retrieval system. In certain embodiments, step 1830 is performed by an initiator, such as initiator 205a, disposed in the data storage and retrieval system. In certain embodiments, step 1830 is performed by a host computer in communication with Applicants' data storage and retrieval system.

Applicants' method transitions from step 1830 to step 1840 wherein the method forms a third storage array, such storage array 1010 (FIG. 10), comprising the first storage array, except the data storage device array comprising the failed data storage device, in combination with the spare data storage assembly, such as assembly 375. In the illustrated embodiment of FIG. 10, the third storage array 1010 comprises data storage device assemblies 350, 355, 360, 365, and 375.

In certain embodiments, step 1840 is performed by a processor, such as processor 132 disposed in the data storage and retrieval system. In certain embodiments, step 1840 is performed by an initiator, such as initiator 205a, disposed in the data storage and retrieval system. In certain embodiments, step 1840 is performed by a host computer in communication with Applicants' data storage and retrieval system.

Figure 10:
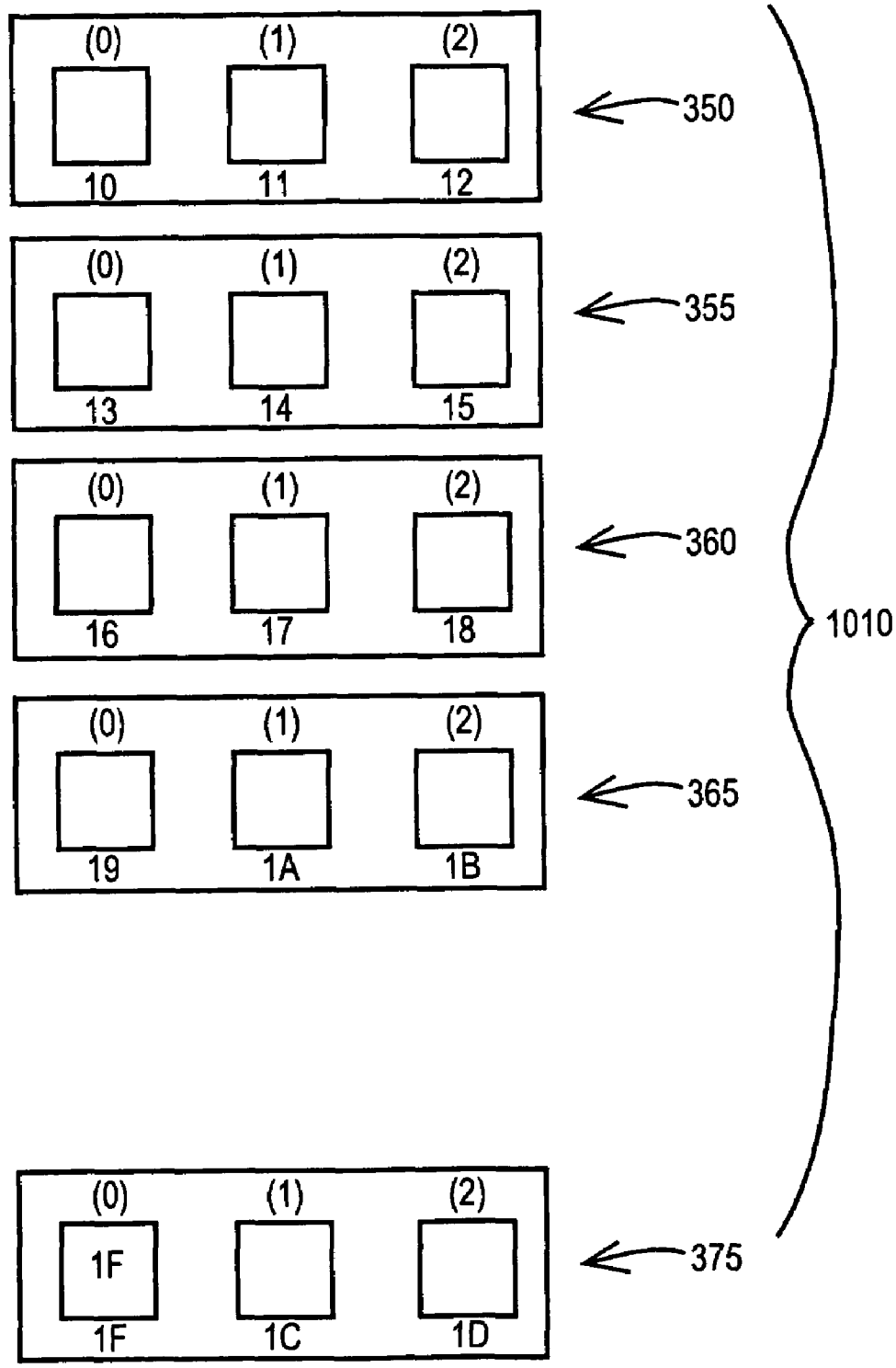
FIG. 10 is a block diagram showing the removal of the degraded data storage device assembly from the data storage and retrievals system.
Figure 18:
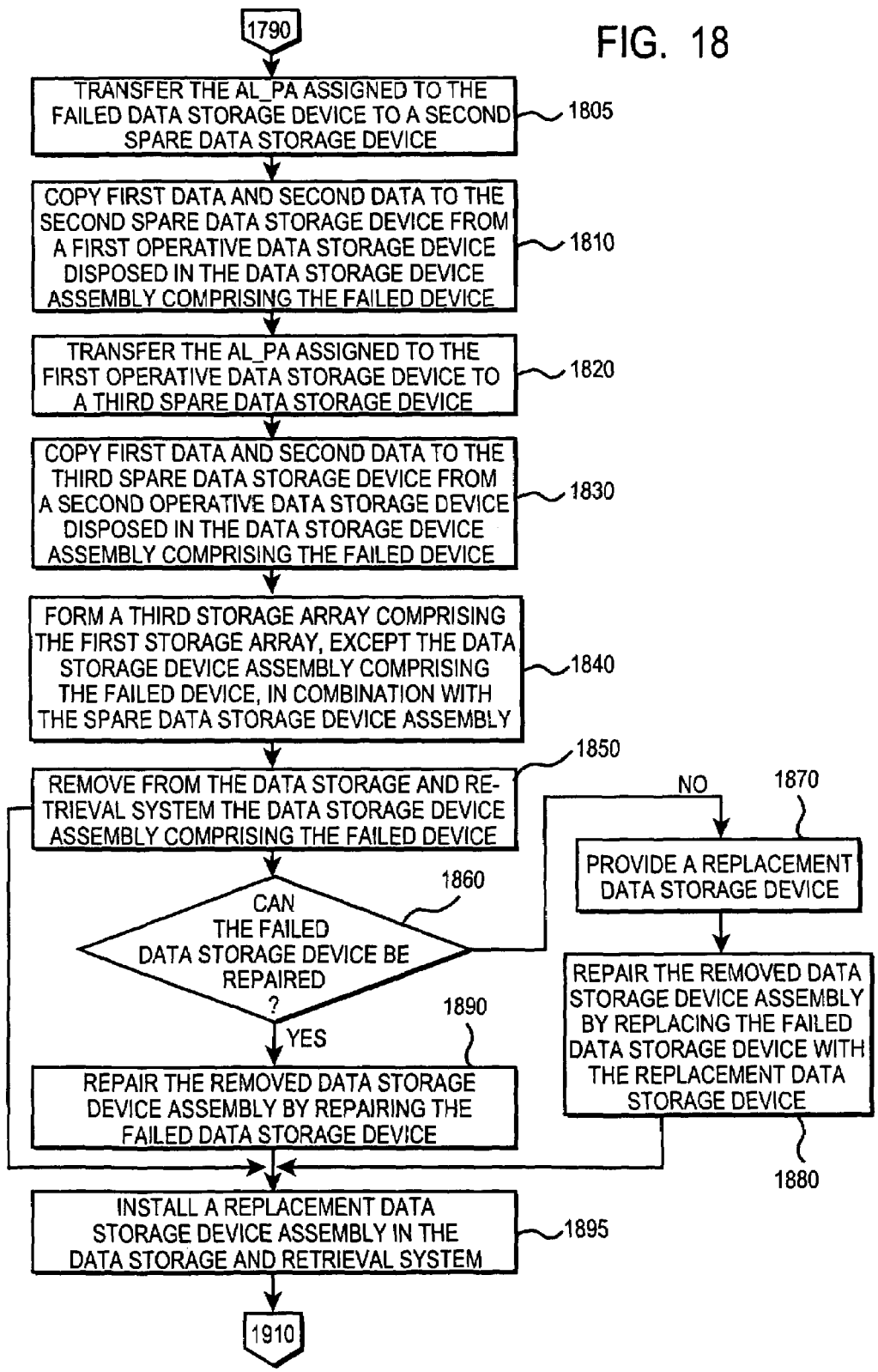
FIG. 18 is a flow chart summarizing certain additional steps of Applicants' method.

Referring now to FIGS. 10 and 18, in step 1850 Applicants' method removes the degraded data storage device assembly from Applicants' data storage and retrieval system. In certain embodiments, step 1850 is performed by the owner/operator of the data storage and retrieval system. In other embodiments, step 1850 is performed by field service personnel. In certain embodiments, Applicants' method transitions from step 1850 to step 1895.

In other embodiments, Applicants' method transitions from step 1850 to 1860 wherein Applicants' method determines if the failed data storage device can be repaired. In certain embodiments, step 1860 further comprises determining if the failed data storage device can be timely repaired, i.e. repaired within a desired time interval. If Applicants' method determines in step 1860 that the failed data storage device cannot be repaired, or cannot be repaired within a desired time interval, then the method transitions from step 1860 to step 1870 wherein the method provides a replacement data storage device. Applicants' method transitions from step 1870 to step 1880 wherein the method repairs the data storage device assembly removed in step 1850 using the replacement data storage device of step 1870. Applicants' method transitions from step 1880 to step 1895.

If Applicants' method determines in step 1860 that the failed data storage device can be repaired, or repaired within a desired time interval, then the method transitions from step 1860 to step 1890 wherein the method repairs the failed data storage device.

Figure 11:
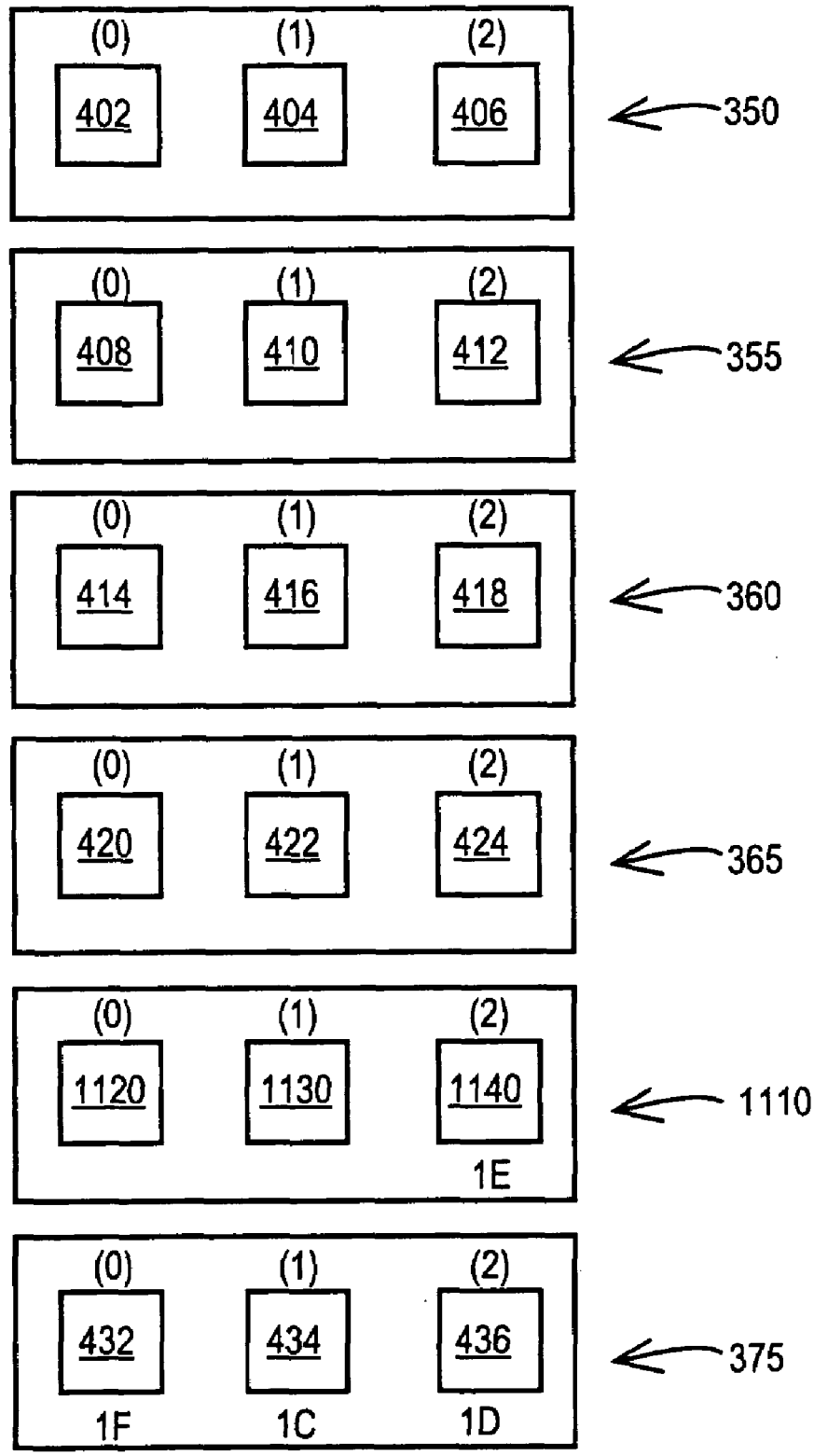
FIG. 11 is a block diagram showing the installation of a replacement data storage device assembly in the data storage and retrievals system.

Referring now to FIGS. 11 and 18, Applicants' method transitions from step 1890 to step 1895 wherein the method provides and installs a replacement data storage device assembly, such as assembly 1110 in the data storage and retrieval system. In certain embodiments, replacement assembly 1110 comprises the degraded data storage device assembly removed in step 1850 and subsequently repaired.

In either event, the data storage device assembly removed in step 1850 comprises a data storage device assigned a network address. For example in the illustrated embodiment of FIG. 9, data storage device 430 is assigned an AL_PA "1E." Step 1895 further comprises assigning the network address previously assigned to a data storage device in the assembly removed in step 1850 to one of the data storage devices, such as data storage device 1140, disposed in replacement assembly 1110.

Applicants' method transitions from step 1895 to step 1910 (FIG. 19) wherein the method determines whether to reconfigure the third storage array of step 1840. In certain embodiments, step 1910 is performed by the owner/operator of the data storage and retrieval system. In certain embodiments, step 1910 is performed by a host computer in communication with Applicants' data storage and retrieval system.

Figure 19:
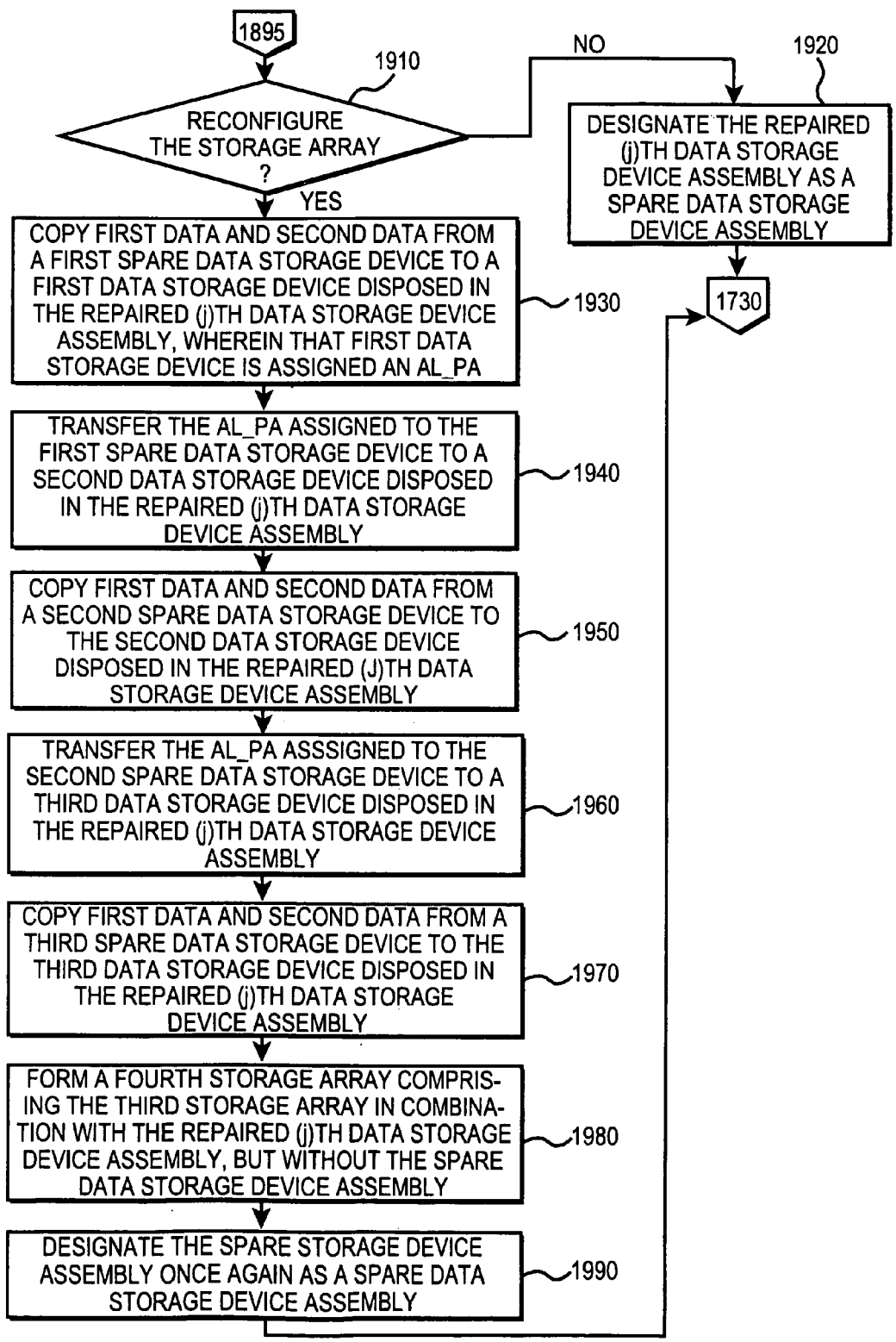
FIG. 19 is a flow chart summarizing certain additional steps of Applicants' method.

Referring to FIG. 19, if Applicants' method elects in step 1910 not to reconfigure the third storage array, then the method transitions from step 1910 to step 1920 wherein the method designates the replacement data storage device assembly, such as assembly 1110, as a spare data storage device assembly. In certain embodiments, step 1920 is performed by a processor, such as processor 132 disposed in the data storage and retrieval system. In certain embodiments, step 1920 is performed by an initiator, such as initiator 205*a*, disposed in the data storage and retrieval system. In certain embodiments, step 1920 is performed by a host computer in communication with Applicants' data storage and retrieval system. Applicants' method transitions from step 1920 to step 1730 and continues as described herein.

Figure 12:
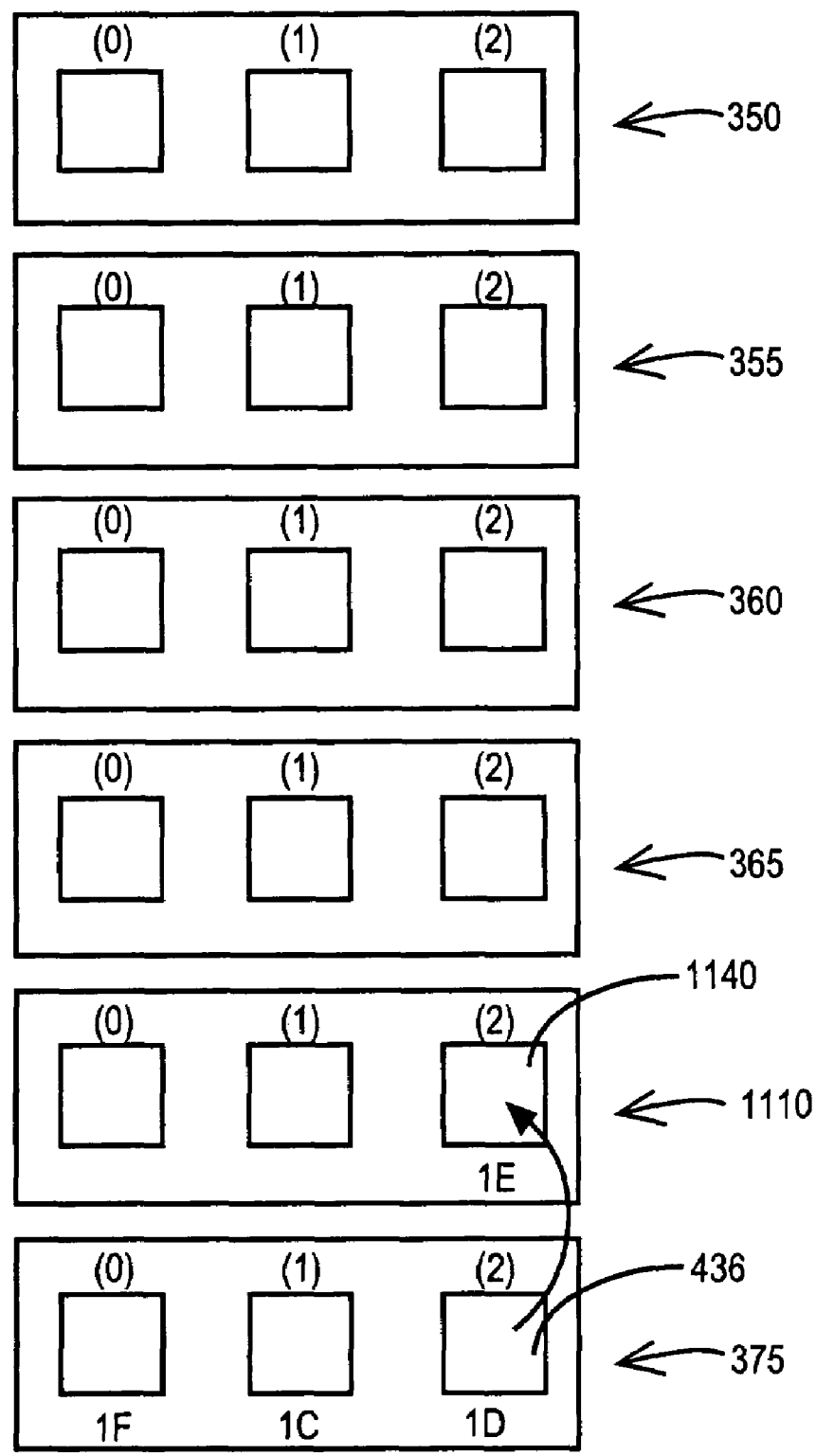
FIG. 12 is a block diagram illustrating a portion of Applicants' method wherein the data written to a first spare storage device disposed in the spare data storage device assembly is copied to a first data storage device disposed in the replacement data storage device assembly.

Referring now to FIGS. 12 and 19, if Applicants' method elects in step 1910 to reconfigure the third storage array of step 1840 to comprise the replacement data storage device assembly, then the method transitions from step 1910 to step 1930 wherein the method copies first and second data from a first data storage device, such as device 436 disposed in the spare data storage device assembly of step 1720 (FIG. 17) to a first replacement data storage device, such as device 1140, disposed in the data storage device assembly installed in step 1895 (FIG. 18), wherein that first replacement data storage device is assigned an AL_PA.

In certain embodiments, step 1930 is performed by a processor, such as processor 132 disposed in the data storage and retrieval system. In certain embodiments, step 1930 is performed by an initiator, such as initiator 205*a*, disposed in the data storage and retrieval system. In certain embodiments, step 1930 is performed by a host computer in communication with Applicants' data storage and retrieval system.

Figure 13:
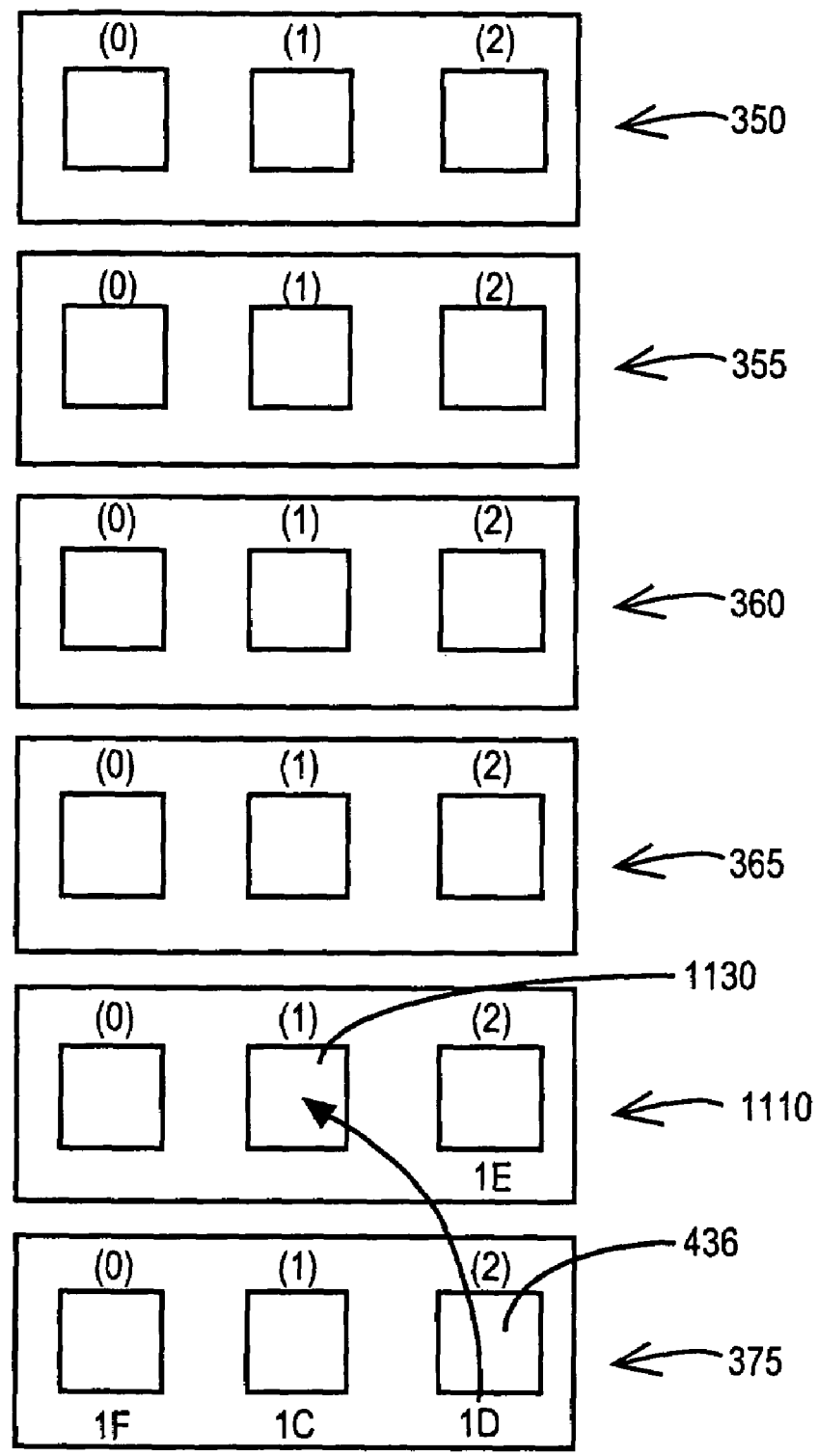
FIG. 13 is a block diagram illustrating a portion of Applicants' method wherein the network address assigned to the first spare data storage device disposed in the spare data storage device assembly is transferred to a second data storage device disposed in the replacement data storage device assembly.

Referring now to FIG. 13, Applicants' method transitions from step 1930 to step 1940 wherein the method transfers the AL_PA assigned to the first spare device of step 1930, such as device 436, to a second replacement data storage device, such as device 1130, disposed in the replacement data storage device assembly. In certain embodiments, step 1940 is performed by a processor, such as processor 132 disposed in the data storage and retrieval system. In certain embodiments, step 1940 is performed by an initiator, such as initiator 205*a*, disposed in the data storage and retrieval system. In certain embodiments, step 1940 is performed by a host computer in communication with Applicants' data storage and retrieval system.

Figure 14:
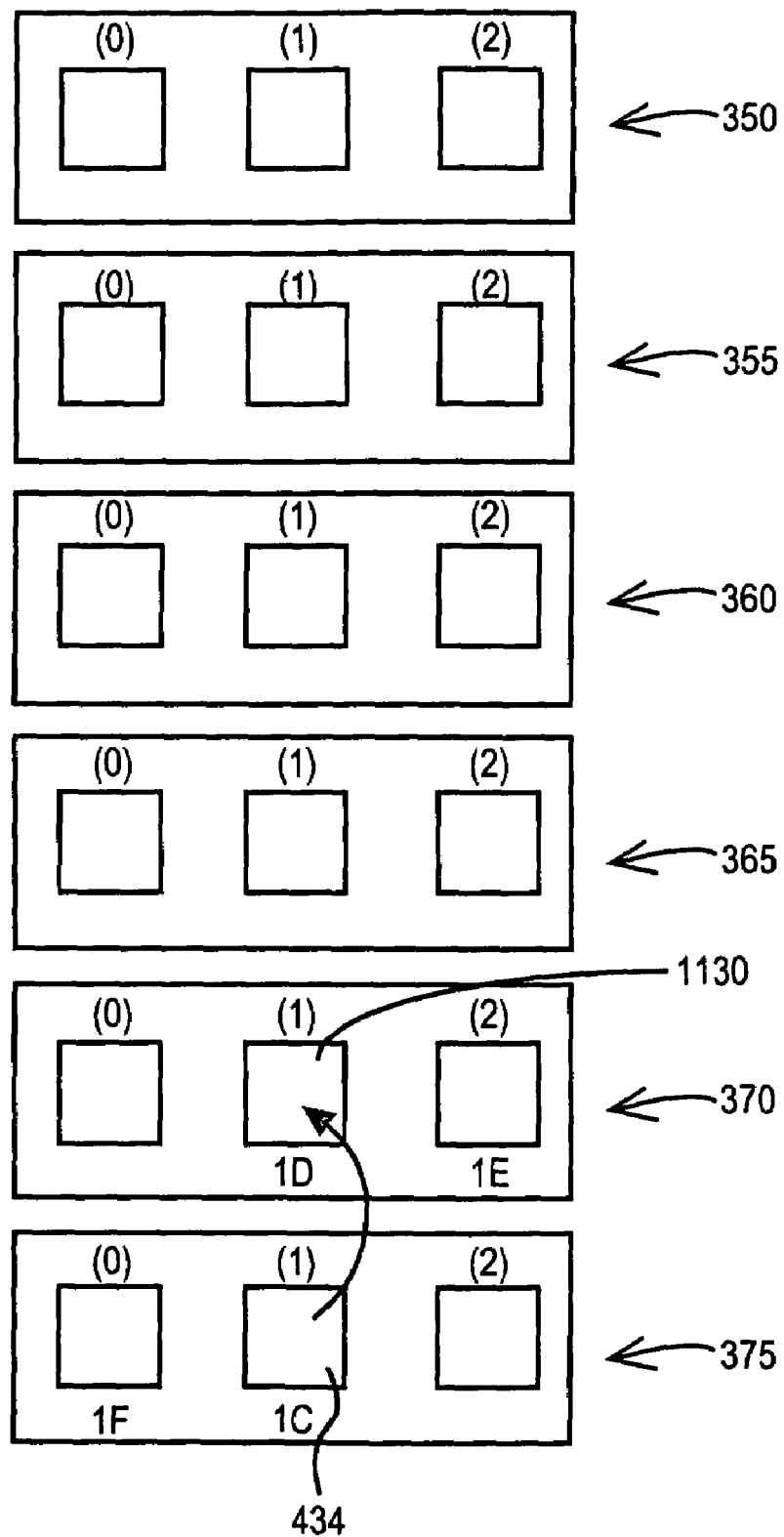
FIG. 14 is a block diagram illustrating a portion of Applicants' method wherein the data written to a second spare storage device disposed in the spare data storage device assembly is copied to the second data storage device disposed in the replacement data storage device assembly.

Referring now to FIG. 14, Applicants' method transitions from step 1940 to step 1950 wherein the method copies first data and second data from the second spare data storage device, such as data storage device 434, to the second replacement data storage device of step 1940. In certain embodiments, step 1950 is performed by a processor, such as processor 132 disposed in the data storage and retrieval system. In certain embodiments, step 1950 is performed by an initiator, such as initiator 205*a*, disposed in the data storage and retrieval system. In certain embodiments, step 1950 is performed by a host computer in communication with Applicants' data storage and retrieval system.

Figure 15:
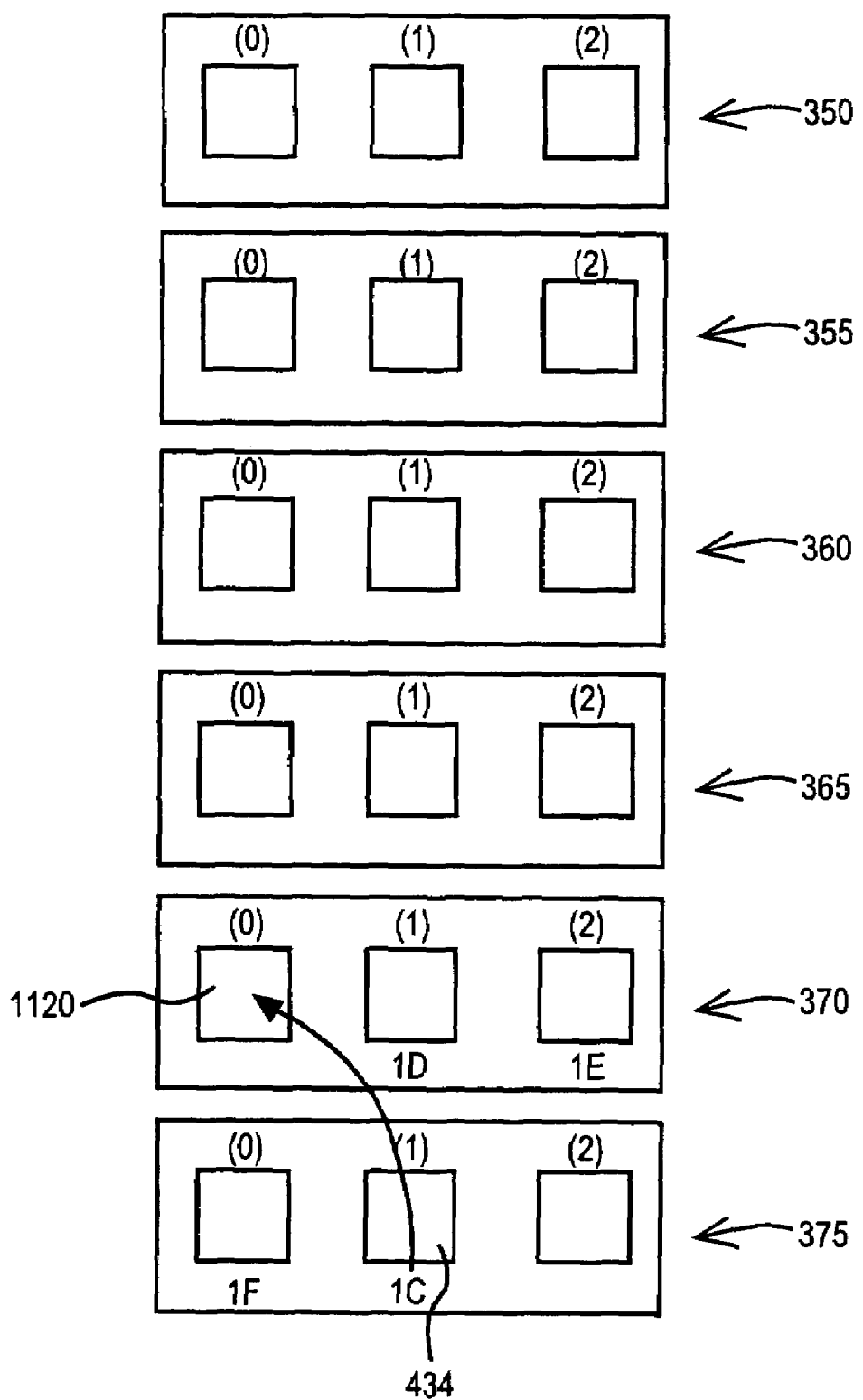
FIG. 15 is a block diagram illustrating a portion of Applicants' method wherein the network address assigned to the second spare data storage device disposed in the spare data storage device assembly is transferred to a third data storage device disposed in the replacement data storage device assembly.

Referring now to FIG. 15, Applicants' method transitions from step 1950 to step 1960 wherein the method transfers the AL_PA assigned to the second spare device of step 1950, such as device 434, to a third replacement data storage device, such as device 1120, disposed in the replacement data storage device assembly. In certain embodiments, step 1960 is performed by a processor, such as processor 132 disposed in the data storage and retrieval system. In certain embodiments, step 1960 is performed by an initiator, such as initiator 205*a*, disposed in the data storage and retrieval system. In certain embodiments, step 1960 is performed by a host computer in communication with Applicants' data storage and retrieval system.

Figure 16:
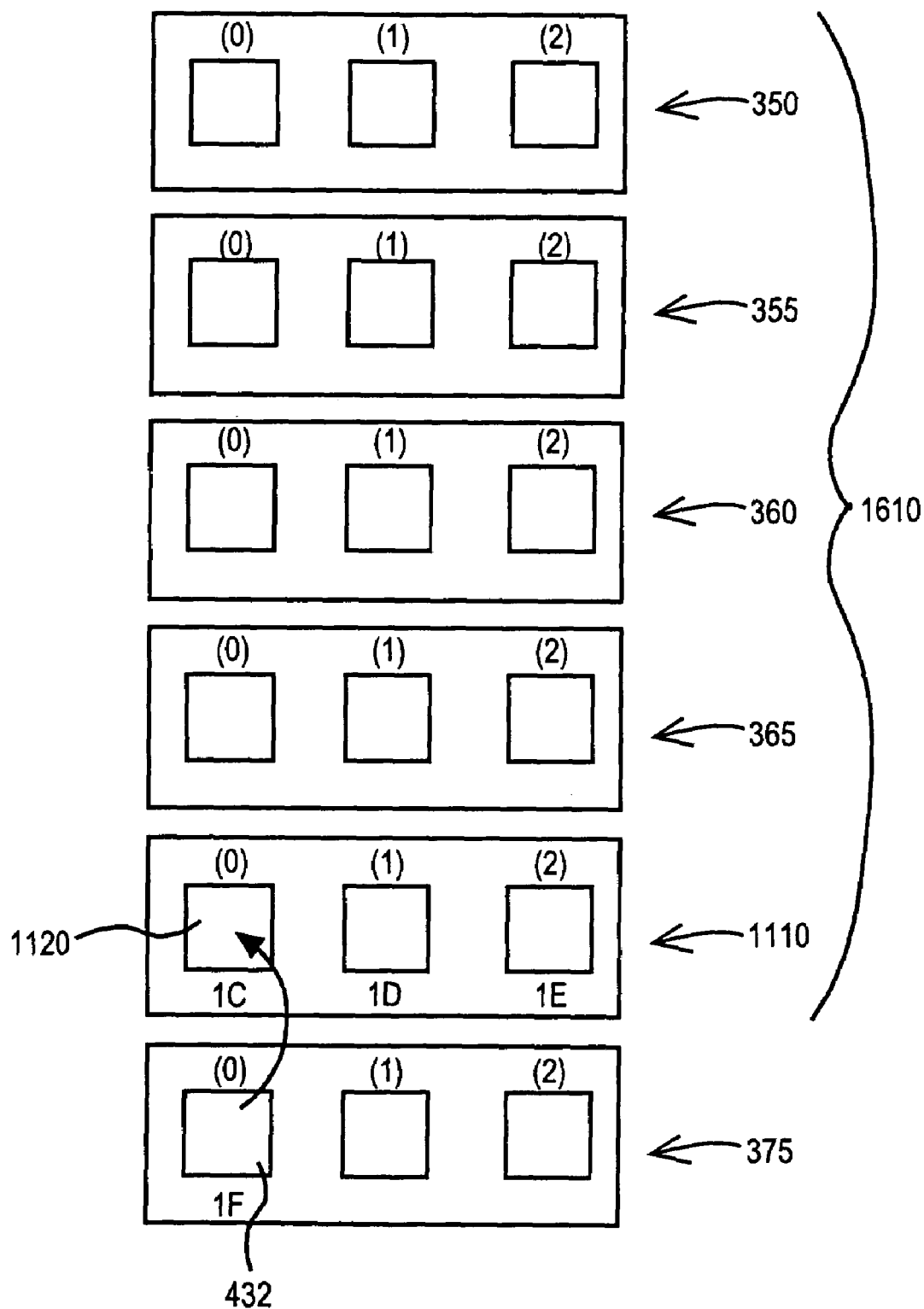
FIG. 16 is a block diagram illustrating a portion of Applicants' method wherein the data written to a third spare storage device disposed in the spare data storage device assembly is copied to the third data storage device disposed in the replacement data storage device assembly.

Referring now to FIG. 16, Applicants' method transitions from step 1960 to step 1970 wherein the method copies first data and second data from the third spare data storage device, such as data storage device 432, to the third replacement data storage device of step 1960. In certain embodiments, step 1970 is performed by a processor, such as processor 132 disposed in the data storage and retrieval system. In certain embodiments, step 1970 is performed by an initiator, such as initiator 205*a*, disposed in the data storage and retrieval system. In certain embodiments, step 1970 is performed by a host computer in communication with Applicants' data storage and retrieval system.

Applicants' method transitions from step 1970 to step 1980 wherein the method forms a fourth storage array, such as storage array 1610, comprising the third array, except the spare data storage device assembly designated in step 1720 (FIG. 17), in combination with the replacement data storage device assembly. In certain embodiments, step 1980 is performed by a processor, such as processor 132 disposed in the data storage and retrieval system. In certain embodiments, step 1980 is performed by an initiator, such as initiator 205*a*, disposed in the data storage and retrieval system. In certain embodiments, step 1980 is performed by a host computer in communication with Applicants' data storage and retrieval system.

Applicants' method transitions from step 1980 to step 1990 wherein the method designates as a spare data storage device assembly the data storage device assembly, such as assembly 375, previously designated a spare assembly in step 1720 (FIG. 17). In certain embodiments, step 1990 is performed by a processor, such as processor 132 disposed in the data storage and retrieval system. In certain embodiments, step 1990 is performed by an initiator, such as initiator 205*a*, disposed in the data storage and retrieval system. In certain embodiments, step 1990 is performed by a host computer in communication with Applicants' data storage and retrieval system. Applicants' method transitions from step 1990 to step 1730 and continues as described herein.

Figure 17B:
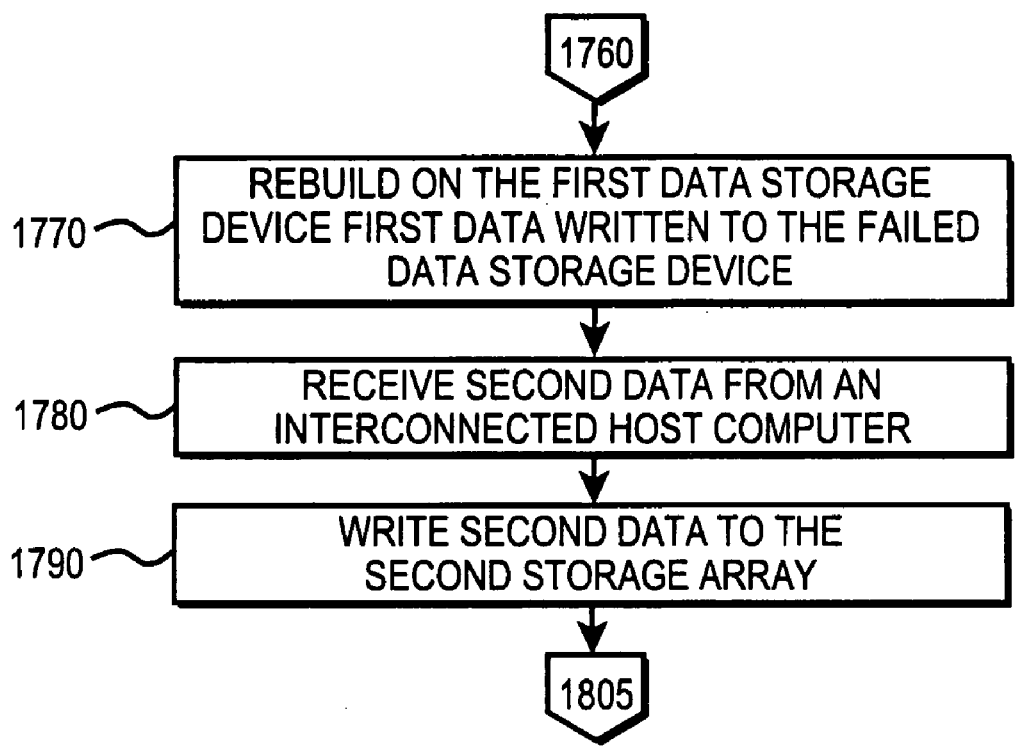
FIG. 17B is a flow chart summarizing certain additional steps of Applicants' method.

In certain embodiments, individual steps recited in FIGS. 17A, 17B, 18, and/or 19, may be combined, eliminated, or reordered.

In certain embodiments, Applicants' invention includes instructions residing in memory disposed in central processing/cache elements 130 (FIGS. 1, 2) and 140 (FIGS. 1, 2), where those instructions are executed by a processor, such as processor 132 (FIG. 1) and/or 142 (FIG. 1), respectively, to perform one or more of steps 1710, 1720, 1730, 1740, 1750, 1760, recited in FIG. 17A, and/or one or more of steps 1770, 1780, and/or 1790, recited in FIG. 17B, and/or one or more of steps 1805, 1810, 1820, 1830, 1840, recited in FIG. 18, and/or one or more of steps 1920, 1930, 1940, 1950, 1960, 1970, 1980, and/or 1990, recited in FIG. 19.

In other embodiments, Applicants' invention includes instructions residing in any other computer program product, where those instructions are executed by a computer external to, or internal to, system 100, to perform one or more of steps 1710, 1720, 1730, 1740, 1750, 1760, recited in FIG. 17A, and/or one or more of steps 1770, 1780, and/or 1790, recited in FIG. 17B, and/or one or more of steps 1805, 1810, 1820, 1830, 1840, recited in FIG. 18, and/or one or more of steps 1920, 1930, 1940, 1950, 1960, 1970, 1980, and/or 1990, recited in FIG. 19. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to assign network addresses in a storage array, comprising the steps of:
    supplying a data storage and retrieval system comprising (P) data storage devices disposed in (N) data storage device assemblies, wherein each of said data storage device assemblies comprises (M) data storage devices, wherein (P) is equal to or greater than 4, and wherein (N) is greater than or equal to 2, and wherein (M) is greater than or equal to 2;
    generating (Q) network addresses, wherein (Q) is less than (P);
    assigning each of said (Q) network addresses to a different data storage device, wherein said (P) data storage devices comprise (Q) data storage devices assigned a network address and (P-Q) data storage devices not assigned a network address;
    configuring said (N) data storage device assemblies to comprise a spare data storage device assembly and a first storage array comprising (N-1) active data storage device assemblies, wherein each data storage device configured in said first storage array is assigned a network address, and wherein an (i)th spare data storage device disposed in said spare data storage device assembly is assigned a network address, and wherein (i) is greater than or equal to 1 and less than or equal to (M);
    detecting a failed data storage device, wherein said failed data storage device is disposed in a degraded data storage device assembly, wherein said first storage array comprises said degraded data storage device assembly;
    forming a second storage array comprising said first storage array, except said failed data storage device, in combination with said (i)th spare data storage device;
    writing first data to said first storage array before detecting said failed data storage device;
    rebuilding on said (i)th spare data storage device first data written to said failed data storage device;
    writing second data to said second storage array;
    transferring the network address assigned to the failed data storage device to a (j)th spare data storage device, wherein (j) is greater than or equal to 1 and less than or equal to (M), and wherein (j) does not equal (i);
    copying first data and second data to said (j)th spare data storage device from a first operative data storage device disposed in the degraded data storage device assembly;
    transferring the network address assigned to said first operative data storage device disposed in the degraded data storage device assembly to a (k)th spare data storage device, wherein (k) is greater than or equal to 1 and less than or equal to (M), and wherein (k) does not equal either (i) or (j);
    copying first data and second data to said (k)th spare data storage device from a second operative data storage device disposed in the degraded data storage device assembly;
    forming a third storage array comprising said first storage array, except said degraded data storage device assembly, in combination with said spare data storage device assembly.

2. The method of claim 1, further comprising the steps of:
    removing said degraded data storage device assembly from said data storage and retrieval system;
    providing a replacement data storage device assembly comprising (M) data storage devices;
    installing said replacement data storage device assembly in said data storage and retrieval system;
    assigning one of said (Q) network addresses to an (a)th replacement data storage device disposed in said replacement data storage device assembly, wherein (a) is greater than or equal to 1 and less than or equal to (M).

3. The method of claim 2, wherein said providing a replacement data storage device assembly further comprises:
    determining if said failed data storage device can be repaired;
    operative if said failed data storage device can be repaired, repairing said failed data storage device to provide a repaired data storage device assembly and designating said repaired data storage device assembly as said replacement data storage device assembly,
    operative if said failed data storage device cannot be repaired:
    providing a replacement data storage device;
    repairing said degraded data storage device assembly by replacing said failed data LP storage device with said replacement data storage device to provide a repaired data storage device assembly;
    designating said repaired data storage device assembly as said replacement data storage device assembly.

4. The method of claim 2, further comprising the step of designating said replacement data storage device assembly as a spare data storage device assembly.

5. The method of claim 2, further comprising the steps of:
    copying first data and second data from said (i)th spare data storage device to said (a)th replacement data storage device;
    transferring the network address from said (i)th spare data storage device to a (b)th replacement data storage device disposed in said replacement data storage device assembly, wherein (b) is greater than or equal to 1 and less than or equal to (M), and wherein (b) does not equal (a);
    copying first data and second data from said (j)th spare data storage device to said (b)th replacement data storage device;
    transferring the network address from said (j)th spare data storage device to a (c)th replacement data storage device disposed in said replacement data storage device assembly, wherein (c) is greater than or equal to 1 and less than or equal to (M), and wherein (c) does not equal either (a) or (b);
    copying first data and second data from said (k)th spare data storage device to said (c)th replacement data storage device;
    forming a fourth storage array comprising said third storage array, except said spare data storage device assembly, in combination with said replacement data storage device assembly.

6. An article of manufacture comprising, an information storage medium having computer readable program code disposed therein, wherein said computer readable code is executable by a processor to assign network addresses to a storage array disposed in an information storage and retrieval system comprising (P) data storage devices disposed in (N) data storage device assemblies, wherein each of said (N) data storage device assemblies comprises (M) data storage devices, wherein (P) is equal to or greater than 4, and wherein (N) is greater than or equal to 2, and wherein (M) is greater than or equal to 2, the computer readable program code comprising a series of computer readable program steps to effect:

generating (Q) network addresses, wherein (Q) is less than (P);

assigning each of said (Q) network addresses to a different data storage device, wherein said (P) data storage devices comprise (Q) data storage devices assigned a network address and (P-Q) data storage devices not assigned a network address;

configuring said (N) data storage device assemblies to comprise a spare data storage device assembly and a first storage array comprising (N−1) active data storage device assemblies, wherein each data storage device configured in said first storage array is assigned a network address, and wherein an (i)th spare data storage device disposed in said spare data storage device assembly is assigned a network address, and wherein (i) is greater than or equal to 1 and Less than or equal to (M);

detecting a failed data storage device, wherein said failed data storage device is disposed in a degraded data storage device assembly, wherein said first storage array comprises said degraded data storage device assembly;

forming a second storage array comprising said first storage array, except said failed data storage device, in combination with said (i)th spare data storage device;

writing first data to said first storage array before detecting said failed data storage device;

rebuilding on said (i)th spare data storage device first data written to said failed data storage device;

writing second data to said second storage array;

transferring the network address assigned to the failed data storage device to a (j)th spare data storage device, wherein (j) is greater than or equal to 1 and less than or equal to (M), and wherein (j) does not equal (i);

copying first data and second data to said (j)th spare data storage device from a first operative data storage device disposed in the degraded data storage device assembly;

transferring the network address assigned to said first operative data storage device disposed in the degraded data storage device assembly to a (k)th spare data storage device, wherein (k) is greater than or equal to 1 and less than or equal to (M), and wherein (k) does not equal either (i) or (j);

copying first data and second data to said (k)th spare data storage device from a second operative data storage device disposed in the degraded data storage device assembly;

forming a third storage array comprising said first storage array, except said degraded data storage device assembly, in combination with said spare data storage device assembly.

7. The article of manufacture of claim 6, said computer readable program code further comprising a series of computer readable program steps to effect:

detecting a replacement data storage device assembly comprising (M) replacement data storage devices;

assigning one of said (Q) network addresses to a (a)th replacement data storage device disposed in said replacement data storage device assembly, wherein (a) is greater than or equal to 1 and less than or equal to (M).

8. The article of manufacture of claim 7, said computer readable program code further comprising a series of computer readable program steps to effect designating said replacement data storage device assembly as a spare data storage device assembly.

9. The article of manufacture of claim 7, said computer readable program code further comprising a series of computer readable program steps to effect:

copying first data and second data from said (i)th spare data storage device to said (a)th replacement data storage device;

transferring the network address from said (i)th spare data storage device to a (b)th replacement data storage device disposed in said replacement data storage device assembly, wherein (b) is greater than or equal to 1 and less than or equal to (M), and wherein (b) does not equal (a);

copying first data and second data from said (j)th spare data storage device to said (b)th replacement data storage device;

transferring the network address from said (j)th spare data storage device to a (c)th replacement data storage device disposed in said replacement data storage device assembly, wherein (c) is greater than or equal to 1 and less than or equal to (M), and wherein (c) does not equal either (a) or (b);

copying first data and second data from said (k)th spare data storage device to said (c)th replacement data storage device;

forming a fourth storage array comprising said third storage array, except said spare data storage device assembly, in combination with said replacement data storage device assembly.

10. A computer program product encoded in an information storage medium usable with a programmable computer processor to assign network addresses to a storage array disposed in a data storage and retrieval system, wherein said data storage and retrieval system further comprises data storage devices disposed in (N) data storage device assemblies, wherein each of said (N) data storage device assemblies comprises (M) data storage devices, wherein (P) is equal to or greater than 4, and wherein (M) is equal to or greater than 2, and wherein (M) is eater than or equal to 2, comprising:

computer readable program code which causes said programmable computer processor to generate (Q) network addresses, wherein (Q) is less than (P);

computer readable program code which causes said programmable computer processor to assign each of said (Q) network addresses to a different data storage device, wherein said (P) data storage devices comprise (Q) data storage devices assigned a network address and (P-Q) data storage devices not assigned a network address;

computer readable program code which causes said programmable computer processor to configure said (N) data storage device assemblies to comprise a spare data storage device assembly and a first storage array comprising (N−1) active data storage device assemblies, wherein each data storage device configured in said first storage array is assigned a network address, and wherein an (i)th spare data storage device disposed in said spare data storage device assembly is assigned a network address, and wherein (i) is greater than or equal to 1 and less than or equal to (M);

computer readable program code which causes said programmable computer processor to detect a failed data storage device, wherein said failed data storage device is disposed in a degraded data storage device assembly, wherein said first storage array comprises said degraded data storage device assembly;

computer readable program code which causes said programmable computer processor to form a second storage array comprising said first storage array, except said failed data storage device, in combination with said (i)th spare data storage device;

computer readable program code which causes said programmable computer processor to write first data to said first storage array before detecting said failed data storage device;

computer readable program code which causes said programmable computer processor to rebuild on said (i)th spare data storage device first data written to said failed data storage device;

computer readable program code which causes said programmable computer processor to write second data to said second storage array;

computer readable program code which causes said programmable computer processor to transfer the network address assigned to the failed data storage device to a (j)th spare data storage device, wherein (j) is greater than or equal to 1 and less than or equal to (M), and wherein (j) does not equal (i);

computer readable program code which causes said programmable computer processor to copy first data and second data to said (j)th spare data storage device from a first operative data storage device disposed in the degraded data storage device assembly;

computer readable program code which causes said programmable computer processor to transfer the network address assigned to said first operative data storage device disposed in the degraded data storage device assembly to a (k)th spare data storage device, wherein (k) is greater than or equal to 1 and less than or equal to (M), and wherein (k) does not equal either (i) or (j);

computer readable program code which causes said programmable computer processor to copy first data and second data to said (k)th spare data storage device from a second operative data storage device disposed in the degraded data storage device assembly;

computer readable program code which causes said programmable computer processor to form a third storage array comprising said first storage array, except said degraded data storage device assembly, in combination with said spare data storage device assembly.

11. The computer program product of claim 10, further comprising:

computer readable program code which causes said programmable computer processor to detect a replacement data storage device assembly comprising (M) replacement data storage devices;

computer readable program code which causes said programmable computer processor to assign one of said (Q) network addresses to an (a)th replacement data storage device disposed in said replacement data storage device assembly, wherein (a) is greater than or equal to 1 and less than or equal to (M).

12. The computer program product of claim 11, further comprising computer readable program code which causes said programmable computer processor to designate said replacement data storage device assembly as a spare data storage device assembly.

13. The computer program product of claim 11, further comprising:

computer readable program code which causes said programmable computer processor to copy first data and second data from said (i)th spare data storage device to said (a)th replacement data storage device;

computer readable program code which causes said programmable computer processor to transfer the network address from said (i)th spare data storage device to a (b)th replacement data storage device disposed in said replacement data storage device assembly, wherein (b) is greater than or equal to 1 and less than or equal to (M), and wherein (b) does not equal (a);

computer readable program code which causes said programmable computer processor to copy first data and second data from said (j)th spare data storage device to said (b)th replacement data storage device;

computer readable program code which causes said programmable computer processor to transfer the network address from said (j)th spare data storage device to a (c)th replacement data storage device disposed in said replacement data storage device assembly, wherein (c) is greater than or equal to 1 and less than or equal to (M), and wherein (c) does not equal either (a) or (b);

computer readable program code which causes said programmable computer processor to copy first data and second data from said (k)th spare data storage device to said (c)th replacement data storage device;

computer readable program code which causes said programmable computer processor to forming a fourth storage array comprising said third storage array, except said spare data storage device assembly, in combination with said replacement data storage device assembly.

* * * * *